US007413838B2

(12) United States Patent
Sugiura et al.

(10) Patent No.: US 7,413,838 B2
(45) Date of Patent: Aug. 19, 2008

(54) EXTERNAL ADDITIVES FOR ELECTROPHOTOGRAPHIC TONER, ELECTROPHOTOGRAPHIC TONER, ELECTROPHOTOGRAPHIC DEVELOPER, IMAGE FORMING METHOD AND IMAGE FORMING APPARATUS

(75) Inventors: Hideki Sugiura, Fuji (JP); Satoshi Mochizuki, Numazu (JP); Yasuaki Iwamoto, Numazu (JP); Kazuhiko Umemura, Shizuoka (JP)

(73) Assignee: RICOH Company, Ltd., Tokyo (JP)

(*) Notice: Subject to any disclaimer, the term of this patent is extended or adjusted under 35 U.S.C. 154(b) by 727 days.

(21) Appl. No.: 10/318,109

(22) Filed: Dec. 13, 2002

(65) Prior Publication Data

US 2003/0190543 A1 Oct. 9, 2003

(30) Foreign Application Priority Data

Dec. 14, 2001 (JP) ........................... P2001-382166

(51) Int. Cl.
*G03G 9/08* (2006.01)
*C04B 14/04* (2006.01)

(52) U.S. Cl. ................. 430/108.6; 430/108.7; 106/482; 106/491

(58) Field of Classification Search .............. 430/108.6, 430/108.7; 106/482, 491
See application file for complete search history.

(56) References Cited

U.S. PATENT DOCUMENTS

| | | | | |
|---|---|---|---|---|
| 5,774,771 | A * | 6/1998 | Kukimoto et al. | 430/126 |
| 6,248,495 | B1 * | 6/2001 | Inokuchi et al. | 430/108.7 |
| 6,363,229 | B1 | 3/2002 | Shiraishi et al. | |
| 6,368,765 | B2 | 4/2002 | Izu et al. | |
| 6,403,271 | B1 * | 6/2002 | Suzuki et al. | 430/108.6 |
| 6,406,826 | B1 | 6/2002 | Suzuki et al. | |
| 6,447,973 | B1 | 9/2002 | Asami et al. | |
| 6,468,706 | B2 | 10/2002 | Matsuda et al. | |
| 6,503,676 | B2 * | 1/2003 | Yamashita et al. | 430/108.3 |
| 6,503,681 | B2 | 1/2003 | Makino et al. | |
| 6,630,276 | B2 * | 10/2003 | Sugiura et al. | 430/108.3 |

(Continued)

FOREIGN PATENT DOCUMENTS

EP 1 150 175 * 10/2001

(Continued)

OTHER PUBLICATIONS

U.S. Appl. No. 11/956,378, filed Dec. 14, 2007, Shu, et al.

*Primary Examiner*—John L Goodrow
(74) *Attorney, Agent, or Firm*—Oblon, Spivak, McClelland, Maier & Neustadt, P.C.

(57) ABSTRACT

An external additives for electrophtographic toner comprising finely divided oxide particulate including a silicon compound and a compound for doping said oxide particulate, wherein particle diameter of the primary particle of said finely divided oxide particulate is in the range of 30 nm to 150 nm, and the primary particle of said finely divided oxide particles is substantially spherical shape having the roundness in the range of 0.95 to 0.996, is provided. And this external additives is capable of evading from the embedding of external additives into toner even if after the toner is held in the storage under the condition of high temperature and high humidity, thereby the additives is capable of showing sufficient functions as fluidizing agent and charge supplement agent, and is capable of inhibiting an abnormal charge elevation even after being stored under the low temperature and low humidity.

10 Claims, 4 Drawing Sheets

U.S. PATENT DOCUMENTS

| | | | | |
|---|---|---|---|---|
| 2003/0031946 | A1 * | 2/2003 | Sugiura et al. ........... | 430/108.3 |
| 2003/0044706 | A1 * | 3/2003 | Konya et al. ............. | 430/108.6 |

FOREIGN PATENT DOCUMENTS

| | | |
|---|---|---|
| JP | 07-003600 | 1/1995 |
| JP | 10-097098 | 4/1998 |
| JP | 10-239993 | 9/1998 |
| JP | 2001-083731 | 3/2001 |
| JP | 2001-194819 | 7/2001 |
| JP | 2001-194825 | 7/2001 |
| JP | 2001-281911 | 10/2001 |
| JP | 2001-281915 | 10/2001 |

* cited by examiner

EXTERNAL ADDITIVES FOR ELECTROPHOTOGRAPHIC TONER, ELECTROPHOTOGRAPHIC TONER, ELECTROPHOTOGRAPHIC DEVELOPER, IMAGE FORMING METHOD AND IMAGE FORMING APPARATUS

BACKGROUND OF THE INVENTION

FIELD OF THE INVENTION

The present invention relates to external additives for electrophotographic toner, an electrophotographic toner, an electrophotographic developer, an image forming method and an image forming apparatus.

Typical image forming process by electrophotography and electrostatic printing method comprises steps of an electric latent image forming step for electrically charging a photoconductive insulating layer uniformly and light-exposing the insulating layer selectively to dissipate electric charge in the exposed area of the insulating layer, thereby forming electric latent image, an image-developing step for adhering a toner of charged fine particles onto the electric latent image to visualize the latent image, an image transferring step for transferring the obtained visual image to a transferring medium such as transferring paper, and fixing step for fixing the transferred image on the transferring material by heating or pressuring (usually using heat roller). As for the developer to visualize the latent image, there are known two-component developer which comprises carrier and toner components, and one-component developer which does not require carrier and uses magnetic toner or non-magnetic toner. With regard to full-color image forming apparatus, there is a well known image forming system in which toner images of each color having been formed on respective photoreceptor are once transferred to an intermediate transfer medium, one above other, thereby a composite color image is formed, then the composite color image is, at a time, transferred to a transfer paper as on image receiving member.

Toner used in such electrophotography or electrostatic printing method is one that employs binder resin and colorant as main ingredients, and if necessary contains additives such as charge control agent, offset inhibitor and other agents, and this toner is required various characteristics to meet aforementioned steps. For instance in developing step, for the sake of satisfactory adhesion of toner to the electric latent image, toner and binder resin must hold a suitable charge for copier and printer so as to be affected no influence of circumferences such as temperature and humidity. And in the fixing step using heat roller fixing system, they must show good non-offset nature exhibiting no adhesion to the used heat roller which is ordinary being heated to a temperature range of ordinary 100 to 230° C. (degree C.). Further, a good blocking-resistance nature, which is a nature of no blocking of toner during preservation, is required too.

In recent years of the field of electrophotography, high quality image-forming technologies have been studied from various points of view, and through these studies, it becomes deeper in the common recognition that down-sizing and spheroidizing of toner are very effective for yielding high quality images. There is however an observed tendency that transferability of toner is declined in proportion to the progress of down-sizing of toner diameter, resulting poorer image qualities. On the other hand as shown by Japanese Laid-open Patent Publication of Tokkai hei 9-258474, it is known that spheroidizing of toner improves transferability of toner.

Under such instance conditions, faster image-formation is desired in the field of color copier and color printer. It is effective to employ “tandem system” which is one system as a described in Japanese Laid-open Patent Publication of Tokkai hei 5-341617.

The tandem system is one system in which particular image components being formed by each image forming unit are piled up, one above another, to a single transfer paper conveyed by transfer belt, thereby form a full color image on the single transfer paper. Color image forming apparatus of the tandem system has excellent characteristics that is a plenty kinds of usable transfer paper, and can form high quality full color image with high processing speed. Especially, said characteristic of capable of forming high quality full color with high processing speed is particular nature that is not shown in other kinds of color image forming apparatus.

On the other hand, there is an attempt to perform a high processing speed in combination with an intention to form a high quality image using spherical shape of toner. If a person intend to attain the high processing speed using an apparatus of said system mentioned above, there is a necessity to shorten the time period of the employed transfer paper to pass through the transfer portions of transfer units. Therefore an elevated transfer pressure is required when the same transfers ability as that of prior technologies should be obtained. However if an elevated transfer pressure is applied, the used toner comes to aggregate in the course of transfer operation, thus an excellent transferring is not yielded, resulting problem of image omissions by toner-absence in the middle of area to be formed solid image.

In order to avoid such problem, there is a known technology in which a formation of a high quality image is contemplated by defining roundness degree, particle diameter, specific gravity and BET (Brunauer, Emmett and Teller) surface area of toner, and also defining adhesion stress in the degree not more than 6 $g/cm^2$ in case of compressing by 1 $kg/cm^2$, as a described in Japanese Laid-open Patent Publication of Tokkai 2000-3063. When adhesion stress of 1 $g/cm^2$, is applied, such stress is too little, thus there are occurred problems of the transferability and the image omissions in the middle of formed letter image, especially in case of OHP substrate, fiber board or surface coated paper are used. And dusty scattering is occurred in case of such small adhesion stress.

Also there is another known technology in which adhesion strength of one particle in toner particulate is defined in 3.0 dyne or less/contact point, thereby improve the mobility of toner, as a described in Japanese Laid-open Patent Publication of Tokkai 2000-352840. However, this is a not one to define the adhesion strength of toner, and although it can improve the mobility of toner, but shows no effect on the transferability and in the prevention of image omissions in the middle of formed letter image.

Further, for the purpose of improving the development ability and the temporal stability, there are known ones in which aggregation strength in a compressed state and the like are defined, as shown by Japanese Patent 3002063. However such definition of aggregation strength in a compressed state still remains problems in the transferability and into the prevention of image omissions in the middle of formed letter image, and is difficult to fully improve the transferability and the transfer ratio of toner developed.

Further, for the purpose of improving the problem of image omissions in the middle of formed letter image, there is another known technology in which the product of aggregation strength multiplied by loose bulk density is defined in the range of 7 or less, as shown in Japanese Laid-open Patent Publication of Tokkai 2000-267422. However, the behavior and physical properties relating to aggregation strength in a compressed state toner is not reflected in this prior art, therefore satisfactory effect with this prior art is not expected in case of the intermediate transfer system and a developing system which are ones imposing stronger stress onto toner to be used.

Furthermore, there is still another known technology in which the ratio of "loose bulk density" for "harden bulk density", namely the ratio of loose bulk density/harden bulk density is defined in the range from 0.5 to 1.0, and aggregation strength is also defined in the range of 25% or less, as shown in Japanese Laid-open Patent Publication of Tokkai 2000-352840. This harden bulk density in this patent literature is a value presented by measured bulk density after 50 times of tapping, and is close to a physical characteristic reflected the fluidity of the toner, but to this value, factors for increasing bulk density of toner imparted mechanical stress is not reflected, thus this value does not show a satisfactory effect in case of the intermediate transfer system and a developing system which are ones imposing stronger stress onto toner to be used.

On the other hand, for the purpose of improving fluidity and charging characteristic of toner, methods for using particulate of toner with mixing with various kinds of inorganic powder such as metallic oxides particulate, have been proposed, they are called as "additives to be externally added" or by other words merely "external additives". Also there are proposed techniques which employ inorganic powder treated by specific silane coupling agents, titanate coupling agents, silicon oils, organic acids and so forth, or employ organic powder coated by specific resins, in order to reform the surface hydrophobic nature and/or charging characteristics of the inorganic powder, if necessary.

As for such inorganic powders for instances, silicon dioxide (silica), titanium dioxide(titania), aluminum oxide, zinc oxide, magnesium oxide, cerium oxide, iron oxide, copper oxide, tin oxide and the likes are known.

Particularly, there have been used ones which include finely divided silica particulate, aluminum oxide particulate, hydrophobic silica particulate substituted in silanol groups existing surfaces thereof by treating agent such as dimethyldichlorosilane, hexamethyldisilane, silicon oil and so forth by reacting the surface silanol groups with said treating agent.

Among these treating agents, silicon oil is favorable one because it shows enough hydrophobic nature, and has a low surface energy therefore imparts an excellent transferability to toner when mixed with the toner.

Japanese Examined Patent Publication of Tokkou Hei 7-3600 and Japanese Patent 2568244 disclose definitions of hydrophobic degree of finely divided silica powder being treated with silicon oils. Japanese Laid-open Patent Publications of Tokkai Hei 7-271087 and Tokkai Hei 8-29598 disclose a definition of silicon oil amount to be added and a definition of carbon content ratio in additives to be used.

The purpose for performing hydrophobic treatment of inorganic powder as mother agent of the external additives so as to thereby achieve a high stability of electric charge of developer under high humidity conditions was able to be satisfied by mean of the adjustment of silicon oil amount to be contained, as that disclosed in above mentioned patent literatures, or by mean of adjustment of hydrophobic degree of finely divided silica powder, as that disclosed in above mentioned patent literatures. However, by utilizing the low surface energy which is an important specific characteristic of the silicon oil, an aggressive trial for decreasing adhesive nature of toner to a contact-charging device, a developer-bearing member (sleeve), a doctor blade, carrier, a latent image-bearing member (photoreceptor), an intermediate transfer member' (medium, body) and the like members, has not been executed.

Particularly, problem of background smearing (fogging) caused by strong adhesive power of developer affecting to the photoreceptor surface, and problem of image omissions in edge portion and middle portion in letter image and line image (region where developer is devoid of transferred in spite of image region) have been not improved, by only adjustments of said silicon oil amount and said hydrophobic degree. Further, also white spot, which is caused by for instance a failure of transferring of toner to concave portion in the course of toner image transferring to a transfer member (toner image-receiving member) having noticeable concave and convex surface, has not been improved. Japanese Unexamined Laid-open Patent Publication of Tokkai Hei 11-212299 discloses a finely divided inorganic particulate including a defined amount of silicon oil as a liquid ingredient. However it is impossible to satisfy above-mentioned characteristics by using this inorganic particulate of such amount silicon oil content.

Uniform and stable electric charges are required for toner particles in electrophotographic toner, and when these conditions are insufficient, quality degradations of image are occurred in accompanying with background smearing, non-uniformity of charge distribution, and other failures. And development mechanism has become smaller along with the progress of downsizing of image forming apparatus, in recent years, therefore charge-rising (charging up) property of the toner in initial stage becomes more important item in order to obtain high quality image, thus various proposals have been made for improving such electric charging natures.

Among these proposals, there are examples of charge characteristics improvement by addition of additives for electrophotographic toner. For instances Japanese Unexamined Laid-open Patent Publication of Tokkai Hei 3-294864 discloses a non-magnetic one-component developer including inorganic powder treated with silicon oil, Japanese Unexamined Laid-open Patent Publication of Tokkai Hei 4-204665 discloses magnetic one-component developer in which coated ratio of toner by additives is in the range of 3 to 30%, Japanese Unexamined Laid-open Patent Publication of Tokkai Hei 4-335357 discloses a developer comprising a toner having fine particulate fixed thereon which particulate has BET specific surface area in the range of 5 to 100 $m^2/g$, and a external additives having a specific surface area of 1.2 times or more of the BET specific surface area of said fixed fine particulate, Japanese Unexamined Laid-open Patent Publication of Tokkai Hei 7-43930 discloses a developer of one-component type comprising a hydrophobic fine powder of silica and a specific hydrophobic fine powder of titan dioxide, and Japanese Unexamined Laid-open Patent Publication of Tokkai Hei 8-202071 discloses a developer comprising toner and additives composed by organic-inorganic complex particulate having organic skeleton and polysiloxane skeleton.

However, even on account of these proposals, performances were not necessarily satisfied, and there have been given inconvenient cases, for examples, uniformity enough of charge was not given, or charge-rising property of toner was still in sufficient, and in connection with environmental stability of toner, particularly the stability for unusual humidity is not necessarily satisfied. In particular, general use of additives of oxide particulate having enhanced hydrophobic property by surface-treatment, which are found out in many conventional proposals, show a desired charge stability only in an initial stage, however occur a problem that toner degradation with the passage of time as for example repeated running.

Further, for example in case of complex particulate composed using liquid phase method like as disclosed in Japanese Unexamined Laid-open Patent Publication of Tokkai Hei 8-202071, liquid medium remained in and among particles may cause counter effect in some cases. Thus there were possibilities that results were not sufficient ones, or the hydrophobic characteristic thereof was changed with the time lapse.

On the other hand, there is a design as disclosed in Japanese Patent 3148950 in which prevention of positional deviation between over-laid colors by adding larger size of finely divided inorganic particulate having average diameter of 50 to 120 nm into the toner, stabilizing of image density and transferring characteristics over long time of period and prevention of soiling, are designed. This technology is however questioned in the effect for improving charge-rising property after many times of printings, in the effect for improving and smearing of background area under the high temperature and high humidity conditions or low temperature and low humidity conditions.

Further, there is a known additives for electrophotographic toner consisting of particulate of oxide obtained by oxidizing a particulate of solid solution comprising two or more kinds of elements, wherein the minimum difference between the first ionizing potentials of said elements in the solid solution is a value in the range of 1.20 eV to 4.20 eV, and the maximum difference between the first ionizing potentials of said elements in the solid solution is a value of 9.00 eV or less. However, particle diameter and particle shape of the inorganic particulate is not fully studied in this technology, thus it can not say by only definition of ionizing potentials that the fluidity, transferring nature and stirring character in development stage of the toner are sufficient.

On the other hand, as for binder resin for toner, polystyrene, styrene-acrylic copolymer, polyester, epoxy resin and the like are usually used from the viewpoint of the required characteristics for toner namely transparency, insulation performance, water resistive property, fluidity as fine particulate, mechanical strength, brightness, thermoplasticity, grindability. Among these resins, styrenic resin is excellent in grindability, water resisting property and fluidity as fine particulate, hence is widely used. However it shows a drawback that when copy reproduced by using toner comprising the styrenic resin is being stored to keep in a document holder made of polyvinyl chloride resin sheet, image surface of the copy is left in closely contacted with the sheet surface, therefore plasticizer contained in the sheet namely in the polyvinyl chloride resin is transferred to the fixed toner image to plasticize and weld the toner image to the sheet side, as a result, if the copy is separated from the sheet, toner image is partially or wholly peeled off from the copy, and the sheet is also soiled. This drawback can be observed in case of a toner containing polyester resin.

As a prevention method of such transferring of the toner image to the polyvinyl chloride resin sheet, there is proposed one in which an epoxy resin capable of no plasticized by plasticizer for polyvinyl chloride resin is blended to styrenic resin or polyester resin to be used, as disclosed in Japanese Unexamined Laid-open Patent Publications of Tokkai Shou 60-263951 and Tokkai Shou 61-24025.

When such blended resin is used for particularly color toner, the incompatibility between different kinds of resins however becomes serious, thus the offset nature, curling of medium for fixed image, brightness of image (image having no brightness appears like poorer one in case of color toner image), color intensity, transparency, color-developability turn problems. These problems are ones which are can not solved entirely by using conventional epoxy resin or modified epoxy resin by acetylation as proposed in Japanese Unexamined Laid-open Patent Publication of Tokkai Shou 61-235852.

Hereupon, it is thought to solve aforementioned problem by single use of epoxy resin, but in this case the reactivity between the epoxy resin and the used amine occurs as a new problem. Generally speaking, epoxy resin is used as a harden type of resin excellent in mechanical strength and chemical resistance, by composing cross-linked structure caused by the reactions between epoxy groups and curing agent. The curing agent is roughly classified into amine type one and organic acid anhydride type. The epoxy resin used for electrophotographic toner is of course thermoplastic one, however amine materials are often presence in dyes, pigments and charge controlling agents used in toner as raw source materials for preparing toner, and these amines are some time react with the employed epoxy resin to form cross-linked structure, these hence are of can not be used in such cases. And proxy group is chemically active and is thought as chemical toxicity, namely skin irritation and the so forth are apprehended and sufficient cares are required in dealing with thereof.

And epoxy group shows hydrophilic nature, therefore water-absorbing property is extreme, under the high temperature and high humidity, causing charge declination, background smear, failure of cleaning. Further, another problem is there in the charging stability of the epoxy resin.

In general, toners are composed from binder resin, colorant, and charge controlling agent and other elements. Various dyes and pigments are known as the colorant, and among these, some colorants are ones having charge controlling property, therefore they have double functions of colorant and charge controlling agent. It is widely known technology to make toner using epoxy resin for binder resin in composition as that in aforementioned modes, there is however a problem of disposability of dyes pigments and charge controlling agent.

Generally speaking, the kneading of binder resin, dye and pigment and charge controlling agent and other elements is conducted by using heat-roller mill, in which there is a necessity that the dye, the pigment and the charge controlling agent and the other elements must be homogeneously dispersed in the binder resin. However, satisfactory disperse are difficult and if the dye and the pigment are being improperly dispersed, color-developing state becomes bad and color density becomes low too. And insufficient disperse of charge controlling agent causes various inconveniences such as uneven charge distribution, causing charge failure, background smear, scatter of toner, scantiness of image density, crumbling of toner particular, failure of cleaning.

Japanese Unexamined Laid-open Patent Publication of Tokkai Shou 61-219051 discloses a toner using a modified epoxy resin esterificated with ϵ-caprolactam, as binder resin. In this toner, although resistance against polyvinylchloride and fluidity are improved, however modified degree is in a high range of 15 to 90 weight %, therefore defects are brought such as the softening point thereof is too much decreased, and excess brightness is shown.

Japanese Unexamined Laid-open Patent Publication of Tokkai Shou 52-86334 discloses a positively charged toner using a reaction product of an epoxy resin in which end epoxy groups of the epoxy resin are being reacted with aliphatic primary or secondary amines. However as described above, it is thought that epoxy group and amine often react to form cross-linked structure, therefore they can not be used as toner some times. Japanese Unexamined Laid-open Patent Publication of Tokkai Shou 52-156632 discloses a toner using a reaction product of an epoxy resin in which one or both end epoxy groups of the epoxy resin are being reacted with alcohol, phenol, Grignard reagent, organic acid sodium acetylide, and alkyl chloride and the like. However if epoxy groups are still remaining, as described above, there are possible shortcomings that they react with amine, and have chemical toxicity and water-absorbing property. Further, among aforementioned reagents, some ones are hydrophilic, and some ones effect to electric charge developing, and some ones effect to pulverizing nature, thus they are not always wholly effective.

Japanese Unexamined Laid-open Patent Publication of Tokkai Hei 1-267560 discloses a positively charged toner using a reaction product of an epoxy resin in which both end epoxy groups of the epoxy resin are being reacted with active hydrogen-containing compound then the reaction product is esterificated with monocarboxylic acid, esterificated derivative thereof, or lactones. In this case the reactivitiy, chemical toxicity and water-absorbing property pursuant to epoxy group are solved, a problem of curling of the used substrate occurred in fixing step is however not improved yet.

Further, generally speaking, solvents such as xylene and the like are used in many cases of the synthesis of epoxy resin or polyol resin (for instance see Japanese Unexamined Laid-open Patent Publication of Tokkai Hei 11-189646), such solvent or unreacted remaining monomers such as bisphenol A are existed in not small amount in the prepared resin, and these phenomena are also shown in case of toners using these resins, hence are problem.

On the other hand, as for preparation method of toner, there is a generally employed method such as one described for example in Japanese Unexamined Laid-open Patent Publication of Tokkai Hei 1-304467 in which all ingredient materials for toner are at a time mixed, heated, melted and dispersed in a kneader to prepare homogenous composition, then this composition is cooled, pulverized and classified, thereby prepares toner having volumetric average particle size in the range of 6 to 10 μm. And electrophotographic color toners used for forming particular color image are in general constituted by dispersing various kinds of colorful dyes or pigments. In this case, required characteristics for toners are more severe than that in the case for the reproduction of black image.

Namely, proper color hue manifestation (color degree) and light transitive nature (transparency) in case of particular use in OHP (over head projector) are required as for characteristics of the toner, in addition of mechanical stability and electric stability for external factors such as mechanical impact and humidity. There are instanced toners using dyes as colorant described for examples in Japanese Unexamined Laid-open Patent Publications of Tokkai Shou 57-130043 and Tokkai Shou 57-130044. However when dyes are used as colorant, although the obtained image is excellent in transparency and color hue manifestation is good, thus is capable of forming sharp color image, but in contrary to this characteristic, there is a problem that the light resistance thereof is inferior, causing color-changing or discoloring by the exposure of direct sunlight.

Further, with regard to image forming apparatus, there is a known intermediate transfer system in which a plural of visible color-developed images being formed on respective image-bearing members such as photoreceptors are primary, one by one, transferred to be piled up them in the mode of one is overlaid on another, on an intermediate transfer member which is endlessly driven, then this primary transferred image of toners on the intermediate transfer member is, at a time, secondary transferred to an adequate image-receiving sheet such as plain paper. This image forming apparatus using intermediate transfer system has the advantages from a viewpoint of expectation in recent years to make downsizing of the scale of image forming apparatus, and also from a viewpoint that the restriction is few in the kinds of final transfer image medium (image-receiving member) capable of employing, therefore there is a tendency that such apparatus is used as particularly color image forming apparatus.

In such an image forming method and apparatus, an occurring problem is that image omissions in the middle of letter image which looks as if an image is eaten by worms, are observed in resultant toner images formed on a receiving material. This is because of the omissions are locally generated on toner images formed in the course of first and second transfer processes. These image omissions looking as traces of eaten by worms are caused by the blanks of transferring in some wide areas in case of spread solid image. And the omissions by transferring blanks in case of line image occur in a profile of generating broken lines Such abnormal image is apt to be generated in case of full color image formation using four colors of toners. This is caused by the reasons that toner layers become thick, and moreover, the primary transfers are repeated four times, therefore strong mechanical adhesives (it is a power such as van der Waals force other than the electrostatic power) between image-bearing member and toner particulate, and between the surface of intermediate transfer medium and particles of toner particulate. And it is also considered as a reason of that so-called filming phenomena of toner adhering in filmed state onto the surface of intermediate transfer medium are occurred in the course of repeated executions of image formation process, thereby adhesive power between the surface of intermediate transfer medium and toner particles, becomes strong.

As technologies for preventing the occurrence of such worms-eaten images, ones are already put in practical use upon commercial available image forming machines, in which, lubricant is coated onto the surface of intermediate transfer medium to decrease adhesive power of intermediate transfer medium for the toner, or external additives is used to decrease adhesive power of toner particles themselves. However, strong adhesive power and tensile fracture strength and the like strength between toners in case of full color image formation using four colors of toners, or in case of transferring contact pressure being increased for executing high speed transferring, have not been considered, therefore there is a remaining problem particularly in the image stability in case of transfer to a pasteboard, surface-coated paper of plastic film for OHP and the like receiving sheets.

Japanese Unexamined Laid-open Patent Publication of Tokkai Hei 8-211755 discloses a technology for preventing the generation of abnormal image in which relative balance between a toner adhesive strength of image-bearing member and a toner adhesive strength of intermediate transfer medium is adjusted, thereby intending to improve transferability of toner. However the toner adhesive strengths in this case are the values which are based upon centrifugal forces of toners at powder states, and these values are different from results reflecting the physical properties shown in case of increased transfer-contact pressure, thus these are unsatisfactory.

The stored state of toner after preparation, the state of high temperature and high humidity, and the state of low temperature and low humidity during toner transportation are crucial conditions for toner, however even under such circumstances, toners are required to exhibit no aggregation each others, and no degradations or even very scarce degradations in charge characteristics, fluidity, transferability, fixing ability. However effective means to cope with such problems have not been found out yet.

SUMMARY OF THE INVENTION

An object of the present invention is to provide an external additives (additives to be externally added) for electrophtographic toner, an electrophotographic toner, an electrophtographic developer, an image forming method and an image forming apparatus, which are capable of providing stable quality of image even after ten thousands sheets of image are output.

More particularly, the object of the present invention is to provide an external additives for electrophtographic toner, an electrophotographic toner, an electrophtographic developer, an image forming method and an image forming apparatus, which are capable of evading from the embedding (buried) of external additives into toner even if after the toner is held in the storage under the condition of high temperature and high humidity, thereby the additives is capable of showing sufficient functions as fluidizing agent and as charge supplement agent, and is capable of inhibiting an abnormal charge elevation even after being stored under the low temperature and low humidity.

Another object of the present invention is to provide an external additives for electrophtographic toner, an electrophotographic toner, an electrophtographic developer, an image forming method and an image forming apparatus, which are adequately controlled in aggregative property and adhesive power between toner particles being suffered from the stress by pressing of toner during transfer of the toner or in development device, and are capable of forming high quality image.

Another object of the present invention is to provide an external additives for electrophtographic toner, an electrophotographic toner, an electrophtographic developer, which show excellent charge stability under the condition of high temperature and high humidity, and under the condition of low temperature and low humidity, and they have little ratio in numbers of weakly charged toner particles and reverse polarity of toner particles in whole toner particles.

Still another object of the present invention is to provide an image forming method and an image forming apparatus, which are capable of forming image showing scarce background smearing, and which are few in scattering of toner particles in the inside of image forming apparatus.

Still another object of the present invention is to provide an image forming method and an image forming apparatus as an image forming system that has high durability and low necessity of maintenance.

Still another object of the present invention is to provide an image forming method and an image forming apparatus in which sufficient toner transfer nature is shown when the toner is pressed, at the same time, sufficient fluidity is shown when the toner is not pressed, and hence excellent supply faculty and charge-rising property of the toner are shown.

Still another object of the present invention is to provide an image forming method and an image forming apparatus, in which the toner and developer to be used are excellent in the stability of the charge under different circumstances, and constant outputs, without declination of image density, are possible in the wide range of low to high printing speed during continuous running for image productions, and balance between fixing nature and anti-offset property is held adequately.

Still another object of the present invention is to provide an image forming method and an image forming apparatus, in which transfer condition is held in good, and color reproductive, color clearness, color transparency are excellent, and brightness is stable and showing no blurred.

Still another object of the present invention is to provide an image forming method and an image forming apparatus, which are excellent in stability for environmental changes and in preservative in environments.

Still another object of the present invention is to provide an image forming method and an image forming apparatus, which show no transfer of toner image to polyvinylchloride sheet surface when the fixed toner image is held in contact with the surface of polyvinylchloride sheet.

Still another object of the present invention is to provide an image forming method and an image forming apparatus, which make substantially no curling of fixed toner image-receiving sheet.

Still another object of the present invention is to provide an image forming method and an image forming apparatus, which are capable of evading from the occurrences of abnormal image such as worms-eaten image, image with toner scattering, poorly reproduced image in thin line part of original.

Above objects and other objects are achieved by the present invention comprising;

(1) An external additives for electrophtographic toner comprising finely divided oxide particulate including a silicon compound and a compound for doping said oxide particulate, wherein particle diameter of the primary particle of said finely divided oxide particulate is in the range of 30 nm to 150 nm, and the primary particle of said finely divided oxide particles is substantially spherical shape having the roundness in the range of 0.95 to 0.996;

(2) The additives according to above described paragraph (1), wherein elemental ingredients composing the particle of said finely divided oxide particulate are uniformly distributed at surface and inside parts.

(3) The additives according to above described paragraph (1), wherein said finely divided oxide particulate comprises at least silicon and titanium;

(4) The additives according to above described paragraph (1), wherein said finely divided oxide particulate is, at surface thereof, being treated by at least silicon-containing organic surface-treating agent;

(5) The additives according to above described paragraph (1), wherein said finely divided oxide particulate is, at surface thereof, being treated by at least silicon oil, and liberalization ratio of said silicon oil is in the range of 10% to 60%;

(6) An elecrophtographic toner having a volumetric average particle diameter in the range of 2 μm to 10 μm, and comprising at least a binder resin and a colorant, and the toner comprises an external additives for electrophtographic toner comprising finely divided oxide particles including a silicon compound and a compound for doping said oxide particles, wherein particle diameter of the primary particle of said finely divided oxide particles is in the range of 30 nm to 150 nm, and the primary particle of said finely divided oxide particles is substantially spherical shape having the roundness in the range of 0.95 to 0.996;

(7) An electrophotographic developer of two-component comprising an elecrophtographic toner and a carrier of magnetic particles, said elecrophtographic toner having a volumetric average particle diameter in the range of 2 μm to 10 μm, and comprising at least a binder resin and a colorant, and the toner comprises an external additives for electrophtographic toner comprising finely divided oxide particulate including a silicon compound and a compound for doping said oxide particulate, wherein particle diameter of the primary particle of said finely divided oxide particulate is in the range of 30 nm to 150 nm, and the primary particle of said finely divided oxide particulate is substantially spherical shape having the roundness in the range of 0.95 to 0.996;

(8) An image forming apparatus loaded by a container filled with an electrophotographic toner, said electrophtographic toner having a volumetric average particle diameter in the range of 2 μm to 10 μm, and comprising at least a binder resin and a colorant, and the toner comprises an external additives for electrophtographic toner comprising finely divided oxide particulate including a silicon compound and a compound for doping said oxide particulate, wherein particle diameter of the primary particle of said finely divided oxide particulate is in the range of 30 nm to 150 nm, and the primary particle of said finely divided oxide particulate is substantially spherical shape having the roundness in the range of 0.95 to 0.996.

And the present invention further comprises following features as favorable executive embodiments;

(9) The additives according to above described paragraph (1), wherein the finely divided oxide particulate is one being obtained by hydrolytic decomposition of corresponding source materials in oxyhydrogen flame;

(10) The electrophotographic toner according to above described paragraph (6), wherein said toner comprises a mixture of said external additives and one or more kinds of additives which have smaller primary particle diameter than that of said external additives;

(11) The electrophotographic toner according to above described paragraph (6), wherein said toner comprises a mixture of said external additives and two or more kinds of additives which have smaller primary particle diameter than that of said external additives;

(12) The electrophotographic toner according to above described paragraph (6), wherein said toner comprises a mixture of said external additives, one or more kinds of additives which have smaller primary particle diameter than that of said external additives, and resin particles having larger primary particle diameter than that of said external additives;

(13) The electrophotographic toner according to above described paragraph (6), wherein said toner has a softening point in the range of 60 to 150° C., an incipient fluidization point in the range of 70 to 130° C., and a glass transition point (Tg) in the range of 40 to 70° C.;

(14) The electrophotographic toner according to above described paragraph (6), wherein binder resin ingredient of said toner has a number-average molecular weight (Mn) in the range of 2000 to 8000, a ratio value (Mw/Mn) of number-average molecular weight (Mn) for weight-average molecular weight (Mw) in the range of 1.5 to 20, and at least one of peak molecular weight (Mp) in the range of 3000 to 13000;

(15) The electrophotographic toner according to above described paragraph (6), wherein binder resin ingredient of said toner comprises at least one polyol resin;

(16) The electrophotographic toner according to above described paragraph (6), wherein binder resin ingredient of said toner comprises at least polyol resin having in main chain epoxy resinous part and polyoxyalkylene part;

(17) The electrophotographic toner according to above described paragraph (6), wherein binder resin ingredient of said toner comprises at least a polyester resin;

(18) The electrophotographic toner according to above described paragraph (6), wherein wax ingredient is comprised and the wax ingredient is dispersed in the form of particulate having average diameter of 3 μm or less, in the toner;

And the present invention also comprises following features as favorable executive embodiments;

(19) An image forming apparatus using the developer for developing electrostatic all charged latent image, in which the electrostatically charged latent image being formed on electrostatic charge image-bearing member is developed by said developer thereby toner image is formed, and a transfer material is in contacted with the surface of the image-bearing member and the toner image is electrostatically transferred to the transfer material, wherein by the used developer is two-component developer described in above paragraph (7), comprising the electrophotographic toner and a carrier of magnetic particles;

(20) An image forming apparatus using the developer for developing electrostatic all charged latent image, in which the electrostatically charged latent image being formed on electrostatic all charged latent image-bearing member is divided into a plurality of ones for multi-color, and which are developed by a plural of different color developers so that the each toner image is formed, and transfer material is in contacted with the surface of the image-bearing member, and the toner images are, at once or in a plurality of times, electrostatically transferred to the transfer material, wherein the used developers are two-component developers described in paragraph (7), which are respectively comprising the electrophotographic toner and a carrier of magnetic particles;

(21) An image forming apparatus using the developer for developing electrostatically charged latent image, in which toner image being formed on image-bearing member is primary transferred onto an intermediate transfer member, then the primary transferred toner image is transferred onto an image-receiving member, wherein the used developer is two-component developer described in paragraph (7), comprising the electrophotographic toner and a carrier of magnetic particles;

(22) An image forming apparatus using the developer for developing electrostatically charged latent image, in which toner image being formed on image-bearing members are primary transferred onto an intermediate transfer member, then the each primary transferred toner image is transferred onto an image-receiving member, wherein said intermediate transfer member has a stillness friction coefficient in the range of 0.1 to 0.6, and the used developers are two-component developer described in paragraph (7), comprising the electrophtographic toner and a carrier of magnetic particles;

(23) A tandem type of color image forming apparatus using the developer for developing electrostatically charged latent image, in which images formed by a plural of image forming units placed in along a transfer belt suspended between a belt driving roller and a belt driven roller are, one by one, so as to be piled up them in the mode of one is overlaid on another, transferred to an image-receiving member, thereby obtaining a color image on the surface of said image receiving member, wherein the used developers are two-component developer described in paragraph (7), comprising the electrophtographic toner and a carrier of magnetic particles;

(24) A tandem type of image forming apparatus using the developer for developing each electrostatically charged latent image, in which the each image being formed on respective image-bearing member is primary transferred onto an intermediate transfer member, then the primary transferred toner images are transferred onto an image-receiving member, and said images formed by a plural of image forming units placed in along a transfer belt suspended between a belt driving roller and a belt driven roller are, one by one so as to be piled up them in the mode of one is overlaid on another, transferred to an image-receiving member, thereby obtaining a color image on the surface of said image receiving member, wherein the used developer is two-component developer described in paragraph (7), comprising the electrophtographic toner and a carrier of magnetic particles.

And the present invention also comprises following feature as favorable executive embodiment;

(25) An image forming method comprises the use of the image forming apparatus described in paragraphs (7).

Figure 1:
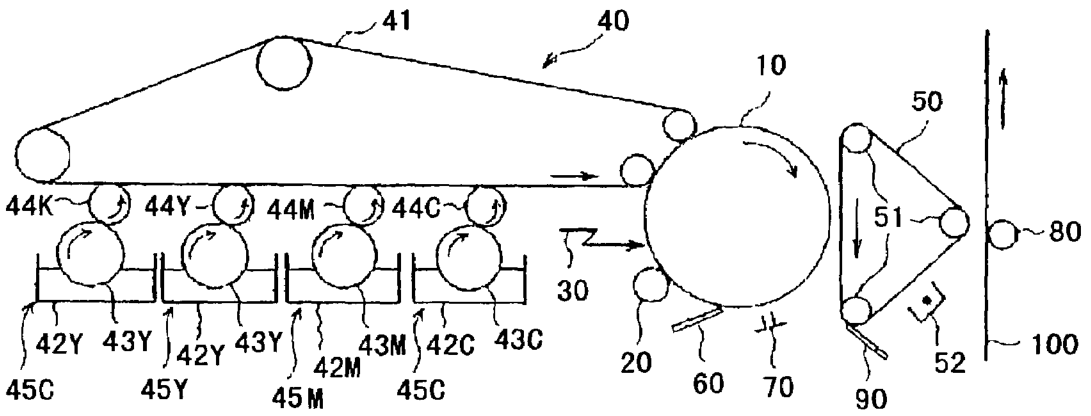
FIG. 1 is a schematic view illustrating the cross section of an embodiment of the electrophotographic photosensitive member of the present invention.

We, the inventors have been earnestly studied to solve the aforementioned objects, and now it is found out that an external additives for electrophotographic toner, which comprises finely divided oxide particulate containing at least a silicon compound and a compound for doping and the oxide particulate has primary particle diameter of 30 to 150 nm and substantially globular shapes of a roundness in the range of 0.95 to 0.996 is employed, thereby these external additives shows no embedding into the inside of toner even after the toner is stored under a condition of high temperature and high humidity, therefore the external additives sufficiently demonstrates the functions as fluidizing agent and charge supplement agent, and are capable of inhibiting an abnormal charge elevation even after being stored under the condition of the low temperature and low humidity, and are capable of providing an image forming system which is adequately controlled in aggregation property and adhesive power between toner particles being suffered from the stress by pressing of toner during of transfer of the toner or in developing device, and are capable of forming high quality image.

Although the mechanism thereof is under elucidation at the present moment, however following technical hypothesis is suspected from the resultant of the analysis of obtained several technical data.

Namely, by the use of the finely divided oxide particulates comprising a silicon compound and a doping compound, the functions as charge supplement agent, electric resistance-imparting agent in an adequate resistance range, and as fluidizing agent for toner are sufficiently demonstrated, and its charge level and resistance level become adjustable by the doping compound. In case of almost all of finely divided oxide particulate, many kinds of the particulate having various dielectric characteristics/resistance characteristics are capable of being produced easily by controlling the composition and oxidation degree of fine particles of the source solid solution, accordingly, by the use of these finely divided oxide particulate, the charge characteristics of the toner are can easily controlled in a desirable range. And by selecting the diameter of the primary particle of these finely divided oxide particulate within the range of 30 nm to 150 nm, an effect as spacer for preventing the aggregation among toner particles is fully demonstrated and a role for preventing the embedding of the finely divided oxide particulate into the inside of the toner particle in case of causing toner degradation by strong agitation of the toner. In addition, by making the toner particulate into the substantially spherical shape having the roundness in the range of 0.95 to 0.996, the fluidity of the toner is improved and affinity of the toner to the finely divided oxide particulate, preventing the separation of the finely divided oxide particulate from toner, to maintain the function of the finely divided oxide particulate as the external additives.

It is further found out in the present invention that the finely divided oxide particulate having above described characteristics can be produced in stable, by mean of the finely divided oxide particulate being obtained by hydrolytic decomposition of corresponding source material in oxyhydrogen flame. And the finely divided oxide particulate for electrophotographic toner, which has only few unevenness of the dielectric characteristics/resistance characteristics therefore has an excellent stability, can be obtained, by achieving homogeneous composition over the surface and inside of the particle of the finely divided oxide particulate.

With regard to said finely divided oxide particulate, usually known materials can be employed, as far as they satisfy the constituent in the present invention, is employed. Their Examples include MgO, CaO, BaO, $Al_2O_3$, $TiO_2$, $SiO_2$ and $SnO_2$ and the like, and particularly combination of two or more kinds of such ingredients. Among these, the finely divided oxide particulate is made by source material containing at least silicon compound and titanium compound, and thereby excellent fluidity, excellent charge characteristics and high durability for strong agitation can be given to the toner.

And, for the purpose of preventing the afterimage which is apt to be generated in the course of development, although it can be considered to be favorable that the electric resistance of developer-bearing member is set in relatively low level thereby the remaining electric charge makes discharge promptly to the developer-bearing member, but such developer-bearing member is likely to discharge the electric charge to be held in the toner, too. On the contrary to that, the finely divided oxide particulate inhibits the leakage of the charge stably therefore can solve aforementioned drawback, by using the toner containing the finely divided oxide particulate.

The finely divided oxide particulate obtained by preparation method of the present invention is possible to be unsaturated oxide, depending on the oxidation conditions for oxidizing the particulate of solid solution, and in such cases there are possibilities of causing the progress of oxidization by time lapse. For the purpose to prevent such oxidation progress, it is allowed to take a measure to change reactive site of the additives particulate, surface treatment using organic silicon surface processing agent and/or organic titanium compound as surface-processing agent is particularly favorable, and, said surface treatment is further favorable if it is one for giving hydrophobic property. The hydrophobe ratio of obtained one is favorable to be in the level of 65% or more.

Further, it is favorable that said finely divided oxide particulate is one being treated by silicon oil and has a liberalization ratio of the value of 10 to 60% of the silicon oil from the oxide particulate, thereby toner surface is covered by silicon oil of adequately adjusted amount, and thereby the improvement of environmental protection nature becomes possible. When the liberalization ratio is 10% or less, characteristic of silicon oil is not demonstrated sufficiently, and if the liberalization ratio is 60% or more, silicon oil is apt to adhere onto the latent electrostatic image-bearing member, causing so-called filming phenomenon, hence unfavorable, in addition to this, toner fluidity is also decreased hence unfavorable too.

Further, it can be attained in case of electrophotographic toner having relatively small particle diameter in the range of 2 to 10 μm and comprising binder resin and colorant, that the nature apt to aggregate and the declination of fluidity, which are inherent natures of small size toner, are prevented, by mean of mixing said finely divided oxide particulate into the toner, and the charge stability and good preservability in environments are improved.

And if said finely divided oxide particulate is mixed with other one or more kinds of additives having smaller average diameter than that of said finely divided oxide particulate, insufficient fluidity, which is shown in case of 30 nm to 150 nm of larger diameter of fine oxide particulate only is used, can thereby be improved, and coverage ratio for toner by additives is made in improved and the affinity among particles of the external additives is improved, hence adhered state of the external additives is made in good condition.

Further, if said finely divided oxide particulate is mixed with other two or more kinds of additives having smaller average diameter than that of said finely divided oxide particulate, fluidity is further improved, and different functions such as charge characteristics and electric resistances are demonstrated by various kinds of external additives such as silica, titanium oxide and alumina can be imparted, therefore the toner becomes comprehensively excellent one in the valance of stability and the fluidity for various circumstances.

In addition, if said finely divided oxide particulate is mixed with further other one or more kinds of additives having smaller average diameter than that of said finely divided oxide particulate and with other one or more kinds of resin particulate having larger average diameter than that of said finely divided oxide particulate, the resin particulate acts like as a spacer medium imposed between toner particle and said finely divided oxide particulate, hence preservability in environments becomes better, and the embedding of external additives into the inside of the toner particle, which is a phenomenon apt to be occurred in case of the degraded toner caused by little amount toner balance, can be prevented, hence can prevent toner spent and declination of toner fluidity.

In addition that, it is found out that sufficient fixing nature, brightness and color-reproductive after fixed can be attained even if aforementioned large size of oxide particles are included, by mean of definitions of that said toner has a softening point in the range of 60 to 150° C., an incipient fluidization point in the range of 70 to 130° C., and a glass transition point (Tg) in the range of 40 to 70° C., and has a number-average molecular weight (Mn) in the range of 2000 to 8000, a ratio value (Mw/Mn) of number-average molecular weight (Mn) for weight-average molecular weight (Mw) in the range of 1.5 to 20, and at least one of peak molecular weight (Mp) in the range of 3000 to 13000.

Further, excellent compatibility of said finely divided oxide particulate with binder resin of the toner, sufficient strength for compressing pressure, tensile fracture strength, environmental stability, stable fixing characteristics are attained, when binder resin ingredient of said toner comprises at least a polyol resin. And environmental stability, stable fixing characteristics, prevention of transfer of toner image to polyvinylchloride sheet surface when the fixed toner image is held in contact with the surface of polyvinylchloride sheet, can be designed if binder resin ingredient of said toner comprises at least polyol resin having in main chain epoxy resinous part and polyoxyalkylene part, thereby significant effect are resulted in color-reproductive, stability of brightness in case of color toner, and prevention of curling after fixing of image on the toner image receiving sheet.

The toner can become excellent one which has excellent strength for compressing pressure and good balance between ability to expand and contract and adhesive nature, further stable transferring faculty, stable development ability and stable fixing ability can be obtained, by mean of binder resin ingredient of said toner comprising at least a polyester resin, when the binder resin contains at least a part of polyester resin.

And with regard to the toner containing wax, the contained wax ingredient in the toner is dispersed so as to form the particulate form having average diameter of 3 μm or less, favorably 2 μm or less, more favorably 1 μm or less in the toner, thereby excellent enough in fixing ability, the prevention of offset by the oozed out wax as releasing agent by heat during fixing operation, and the decrease of adhesive power among the toner particles are become possible, even if the silica particulate having large particle diameter is also added into the toner.

The two-component developer can be obtained which has excellent balance of adhesive power between toner and carrier. Which shows small change in stressed and has sufficient bulk density and has excellent charging-up characteristics and excellent charge stability in various circumstances, by using the electrophotographic developer of two-component type comprising an electrophtographic toner and a carrier of magnetic particles. And thereby the developing system having excellent concentration-controllability by using bulk density sensor and the like sensor can be obtained.

When end parts of the said polyol resin as the binder resin for toner are inactive, toner having excellent stability in the change of circumstances with non toxicity can be obtained.

The epoxy resin used in the present invention is favorably one which is obtained by bonding bisphenol such as bisphenol A and bisphenol F with epichlorohydrin. It is favorable for the purpose of obtaining stable fixing characteristics and brightness, that the epoxy resin comprises two or more kinds of bisphenol A type of epoxy resins, in which an ingredient of low molecular weight is favorably one having number-average molecular weight of 360 to 2000, and an ingredient of high molecular weight is favorably one which having number-average molecular weight of 3000 to 10000. Further, it is favorable that the ratio of the low molecular weight ingredient having favorably number-average molecular weight of 360 to 2000 is in the range of 20 to 50 weight %, and the high molecular weight ingredient having favorably number-average molecular weight of 3000 to 10000 is in the range of 5 to 40 weight %. Excess amount or lower molecular weight of the low molecular weight ingredient is apt to cause the excess brightness of reproduced image or declination of stability in storage. And there are possibilities in case of excess amount of higher molecular weight than 10000 of molecular weight of the high molecular weight ingredient to cause the shortage in brightness of reproduced image or the declination of fixing ability.

Alkylene oxide-adduct of the divalent phenol used as polyol binder resin ingredient of the toner of the present invention includes for instances reaction product of ethylene oxide, propylene oxide butylene oxide and mixture thereof with the bisphenol such as bisphenol A and bidphenol F. It is allowed to use the glycidylation reaction product of the obtained adduct with epichlorohidrin, β-methylepichlorohidrin.

Particularly, a glycidyl ether of alkylene-oxide-adduct of bisphenol A denoted by following general formula (1) is favorable.

Formula (1)

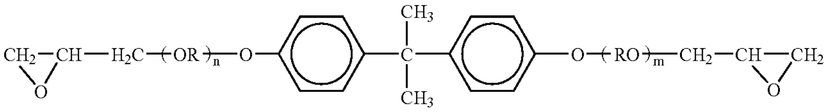

(where, R represents $-CH_2-CH_2-$, $-CH_2-C(CH_3)H-$, or $-CH_2-CH_2-CH_2-$, and, n and m are respectively repeating units which are 1 or more, and n+m is a value in the range of 2 to 8).

It is favorable that 10 to 40 weight % of the alkylene oxide-adduct or glycydil ether thereof for the polyol resin 100 weight % are included. Shortage amount causes drawbacks such as curling of image-receiving sheet and the like drawback, excess amount or larger value than 8 of the n+m causes excess brightness of reproduced image or the declination of stability in storage of the toner.

The compound used in the present invention and having a reactive hydrogen capable of reacting with epoxy group in the molecular structure includes monovalent phenols, secondary amines, carboxylic acids. As the monovalent phenols, phenol, cresol, isopropyl phenol, amino phenol, nonyl phenol, dodecyl phenol, xylenol and p-cumyl phenol and the like phenols are included. The secondary amines include diethyl amine, dipropyl amine, dibutyl amine, N-methyl(ethyl)pyperazine, piperidine and the likes. The carboxylic acids include propyonic acis, caproic acid and the other acids.

For the purpose of obtaining polyol resin used in the present invention which has epoxy resinous part and alkylene oxide part in main chain, various combinations of source materials are possible. For example the polyol resin can be obtained by reacting epoxy resin having glycydil groups at both side ends of molecular structure and alkylene oxide adduct of divalent phenol having glycydil groups at both side ends of molecular structure, with dihalide, diisocyanate, diamine, diol, polyvalent phenol, dicarboxylic acid. Among these, the most favorable is one obtained from the reaction with divalent phenol, from viewpoint of reaction stability. And it is favorable to use polyphenol or polycarboxylic acid in the amount so as to avoid gelation together with divalent phenol. Hereupon, the use amopunt of the polyphenol or/and polyvalent carboxylic acid are favorably 15% or less of whole of usage source materials, and favorably 10% or less.

The compound used in the present invention and having two or more reactive hydrogen atoms capable of reacting with epoxy group in the molecular structure includes divalent phenol, polyvalent phenol, polyvalent carboxylic acid and so forth. As the divalent phenols, bisphenol such as bisphenol A, bisphenol F and the like are included. And as the polyvalent phenol, ortho-cresol novolaces, phenol novolaces, tris(4-hydroxyphenyl)methane, 1-[α-methyl-α-(4-hydroxyphenyl)ethyl] benzene are instanced. As the polyvalent carboxylic acid, moloic acid, succinic acid, glutaconic acid, adipic acid, maleic acid, fumaric acid, phthalic acid, terephthalic acid, trimellitic acid, trimellitic anhydride are instanced.

The binder resin for toner used in the present invention is made to be the polyol resin having proxy resinous part and polyol resinous part containing polyalkylene part and polyester part in the main chain, thereby particularly by said polyester part, viscoelasticity and hardness of the resin are changed, hence more softy physical property of the resin is realized, accordingly, curling of the toner image receiving sheet can be suppressed, hence more favorable.

The epoxy equivalence of the binder resin is controlled to the level of 10000 or more, favorably 30000 or more, more favorably 50000 or more, thereby thermal characteristics of the resin become adjustable, and can decrease the amount of low molecular epichlohydrin and the like as the remained of reaction, hence can be obtained toner excellent in both safety and resin characteristics.

And with regard to the image forming apparatus, the image forming apparatus using the developer for developing electrostatic charge image of the present invention is made to one apparatus in which electrostatically charged latent image being formed on electrostatic charge image-bearing member is divided into a plurality for multi-color, and which are developed by a plural of different color developers so that the each toner image is formed, and transferring material is in contacted with the surface of the image-bearing member, and the toner images are, at once or in a plurality of times, electrostatically transferred to the transferring material, wherein the used developers are two-component developers described above, which are respectively comprising the electrophtographic toner and a carrier of magnetic particles. Thereby the apparatus can provide image-forming system showing only scarce transferring fault, particularly scarce image fault in color reproductive.

The multi color developing apparatus equipped with a developing roller, and a developing blade for controlling the thickness of layer of developer supplied onto the developing roller, in which electrostatically charged latent image being formed on each electrostatic charge image-bearing member is divided into a plurality for multi-color, and which are developed by a plural of different color developers so that the each toner image is formed, and transferring material is in contacted with the surface of the image-bearing members, and the toner images are, at once, electrostatically transferred to the transferring material, wherein the used developers are two-component developers described above, which are respectively comprising the electrophtographic toner and a carrier of magnetic particles. There the apparatus can provide image-forming system showing only scarce transferring fault, particularly scarce image fault in color reproductive, and having compact constitution.

The image forming apparatus in which images being formed on image-bearing member are primary transferred to an intermediate transfer members then the images being on the transferring members are secondary transferred onto a image receiving member, wherein the intermediate transfer medium is an elastic intermediate belt having a hardness(HS) in the range of 10°≦HS≦65° by JIS (Japanese Industrial standard)-A. Thereby high quality image with no worm-eaten like default, and excellent transferring characteristics, excellent reproductive of narrow line image. Adjustment of optimum hardness of the belt may become necessary pursuant to the belt thicknesses. The belt having hardness by JIS-A less than 10° is very difficult to form with high dimensional accuracy. This depends upon the nature of high susceptibility of dimension apt to be suffered from effect of shrinkage and expansion. And although when softening is desired, oily ingredient is generally added into the base material, however it is understood that the oily ingredient has a drawback that oily ingredient is likely to ooze out from the basic material in case of continuous operation of the belt under the pressure, thereby photoreceptor, which is in contact with the intermediate transfer belt, is polluted, causing stripe blurs in cross direction. Surface layer is, in general, provided for the sake of improvement of repellency or in other words releasing nature, the surface layer is required to have high quality of characteristics such as tolerance characteristic and the like for achieving the purpose of imparting perfect prevention effect of oozing out of oily material, hence becomes difficult to select suitable materials and to ensure the characteristics. In contrast to that, the belt having the hardness more than 65° by JIS-A can be formed with good accuracy of dimension in proportional to elevated hardness and is capable of containing no or only small amount of oil ingredient, therefore is capable of decreasing blurs of the photoreceptor, however improvement of transferring ability such as elimination of void of transferring in middle part of letter image becomes impossible, and suspension with tensioned of the belt material between rollers also becomes difficult.

The image forming apparatus in which said intermediate transfer belt has a stillness friction coefficient in the range of 0.1 to 0.6, favorably 0.3 to 0.5 is provided by the present invention, and by using this image forming apparatus, sliding state of toner and the intermediate transfer member become smooth, thus transferring ability is improved, background smearing is decreased, exhausted toner amount becomes little, and toner consumption is decreased.

Above mentioned image forming apparatus which has however a plural of color developing apparatuses for multi color, and each of which is equipped with a developing roller and a developing blade for controlling the thickness of layer of developer to be supplied to the developing roller, in which electrostatically charged latent image being formed on electrostatic charge image-bearing member is divided into a plurality of latent image for multi-color, and each latent image is developed by a color developer corresponding to the each latent image so that the each toner image is formed, is provided by the present invention, thereby, an image forming apparatus can be obtained which is capable of reproducing high quality image excellent in color reproductive, very scarce in transferring failure at transferring step, and scarce in image defect.

And a tandem type of color image forming apparatus using the developer for developing electrostatically charged latent image, in which images formed by an array consisting of a plural of image forming units placed in along a transferring belt suspended between a belt driving roller and a belt driven roller are, one by one so as to be piled up them in the mode of one is overlaid on another, transferred to an image receiving member, thereby obtaining a color image on the surface of said image receiving member, wherein the used developer is said two-component developer, comprising the electrophtographic toner and a carrier of magnetic particles, is provided by the present invention. Thereby an image forming apparatus can be obtained which is capable of corresponding to high speed printing of images, and is hard to be suffered from kind of materials such as substrate for OHP, pasteboard, coated paper and other substrates, very scarce in transferring failure at transferring step, and scarce in image defect.

Hereafter, more detailed explanations would be made. For preparation methods and source materials for the external additives for toner, and whole systems concerning with the electrophotographic process used in the present invention, the known thereof are, as far as they satisfy the given conditions, allowed to be used as ones for the present invention.

[Oxide Particulate]

The oxide particulate by the present invention is prepared by direct oxidation of fine particulate of solid solution, therefore, there is no remaining of liquid medium in the particulate which may be existed in case of polymer particulate obtained by using liquid phase such as dispersion polymerization, therefore, the particulate is very high purity of one. In addition that, there is no necessity using of other components such as polymerization catalyst, hence is no possibility to contain them.

Elements for preparing the oxide particulate of the present invention are particulates of elements to form the oxides, which are capable of containing compounds to be doped as shown below, and which belong to II to IV groups of the periodic table of the elements. Favorably they are elements of period 3 or more, and generally speaking, it is favorable to use elements such as Mg, Ca, Ba, Al, Ti, V, Sr, Zr, Si, Sn, Zn, Ga, Ge, Cr, Mn, Fe, Co, Ni, Cu and the like. Ti and Zn are more favorable. And favorable preparation method of inorganic particulate is one using flame hydrolizing technique to treat with such compounds in the oxyhydrogen flame.

And the particle diameter of primary particle of the oxide particulate is in the range of 30 nm to 150 nm, more favorably in the range of 40 nm to 100 nm. The particle diameter of primary particle described here is number average particle diameter of primary particle. The diameter of primary particle of inorganic oxide is capable of measuring by a measuring assembly to determine the distribution of particle diameters using dynamic light scattering, for instances model DLS-700 made by Otsuka electronics Co. Ltd, or Coulter counter N4 made by Coulter Electronics Co., Ltd. However disentanglement of secondarily aggregated particles after treatment is difficult, therefore it is favorable to calculate the particle diameter directly by photograph obtained from scanning electron microscope or transmission electron microscope. In this case the oxide particles more than 100 are observed, and average value of long axes thereof is calculated.

The particulate of external additives of the present invention also has a feature in the point of the shape thereof, namely, it has substantially spherical shape of the roundness in the range of 0.95 to 0.996, favorably in the range of 0.98 to 0.996. The roundness can be measured by various methods, for example, it can be conducted by analyzing photographs obtained from scanning electron microscope or transmission electron microscope with image processing program using computer, then calculating the arithmetic mean of the roundness from obtained data based upon the photographs by using the calculating formula shown below. In case of using scanning electron microscope, there is a danger to change original shapes of the particles by vapor deposition of platinum and the like, therefore it is favorable to use device having super high resolution such as Ultra resolution PE-SEM model S-5200 made by Hitachi Ltd. And the like which is capable of making resolution enough even if it is decreased in the thickness of deposited layer, and it is lowered in the acceleration voltage used, or without such deposition.

Roundness=(circumference length of corresponding circle)/(circumference length of projected image of the measured particle) [Formula 1]

In above described formula 1, the "circumference length of projected image of the measured particle" is a total lengths of contour lines between edge points locating at fringe part of binarized image of the particle, and said "circumference length of corresponding circle" is circumference length of a circle having the same area as that of the binarized image of the particle. Toner having the roundness less than 0.95 causes a declination of the fluidity thereof. Toner having the roundness more than 0.996 has a tendency to make the external additives to be difficult adhering onto the surface of toner particle, hence causing the affinity decrease between the toner and the external additives, therefore the external additives does not demonstrate the function as the external additives, declining preservation ability in circumstances and charging characteristics in circumstances of the developer, effecting on bad influences to the image.

With regard to the composition of said fine oxide particulate, ingredients are favorably dispersed uniformly into the surface part and into the inside part, the conditions of if they are being uniformly dispersed or not can be understood by conducting the elemental analysis and mapping of analyzed elements over the surface and inside areas with the use of scanning electron microscope having the functions of element analysis and mapping, for example Scanning Electron Microscope model HD-2000 made by Hitachi Ltd. And if the particle size of element and amount ratio are a value in the range of 0.7 to 1.3, the resultant is understood as one which is uniformly dispersed.

[External Additives]

As external additives other than the oxide particulate, fine inorganic particulate and hydrophobe-treated fine inorganic particulate can be used in combination with the oxide particulate, it is desirable to use at least two or more kinds of inorganic particulates having average diameters of primary particles in the range of 1 nm to 100 nm, more favorably 5 nm to 70 nm. Further it is more favorable to use at least two or more kinds of hydrophobe-treated inorganic particulates having average diameters of 20 nm or less of primary particles, together with at least one or more kinds of inorganic particulates having average diameters of 30 nm or more of primary particles. And BET specific surface area of the external additives is favorably a value in the range of 20 to 500 $m^2/g$.

As the external additives, all of known ones can be employable, as far as they satisfy the defined conditions. For examples fine particulate of silica, hydrophobic silica, metallic salts of aliphatic acids such as stearic acid zinc salt, stearic acid aluminum salt and the like, metallic oxides such as titania, alumina, tin oxide, antimony oxide and the like, fluoro-polymers may be included.

As particularly suitable additives, hydrophobe-treated fine silica, fine titania, fine tin oxide and fine alumina particulates are included. As the fine silica particulate, HDK H 2000, HDK H 2000/4, HDK H 2050EP, HVK21, HDK H 1303, which are supplied by Heohst, R972, R974, RX200, RY200, R202, R805, R812, which are manufactured by Nippon Aerosil Co. Specific examples of the titania include P-25 which is manufactured by Nippon Aerosil Co.; STT-30 and STT-65C-S, which are manufactured by Titan Kogyo K.K.; TAF-140, which is manufactured by Fuji Titanium Industry Co., Ltd.; and MT-150W, MT-500B, and MT-600B, MT-150A, which are manufactured by Tayca Corp. Specific examples of the titanium oxides, which are subjected to a hydrophobic treatment, include T-805, which is manufactured by Nippon Aerosil Co.; STT-30A and STT-65S-S, which are manufactured by Titan Kogyo K.K.; TAF-500T and TAF-1500T, which are manufactured by Fuji Titanium Industry Co., Ltd.; MT-100S and MT-100T, which are manufactured by Tayca Corp.; and IT-S, which is manufactured by Ishihara Sangyo Kaisha Ltd.

Hydrophobic silica, titania and alumina can be prepared by treating hydrophilic silica, titania and alumina with a silane coupling agent such as methyltrimethoxy silane, methyltriethoxy silane, octyltrimethoxy silane and the like, or a silicone oil.

Also, fine oxide particulate and fine inorganic particulate, which are treated with silicon oil by heating if necessary, are favorable too.

Specific examples of the silicon oil include dimethyl silicon oil, methylphenyl silicon oil, chloro phenyl silicon oil, methy hydrogen silicon oil, alkyl-modified silicon oil, fluoro-modified silicon oil, polyether-modified silicon oil, alcohol-modified silicon oil, amino-modified silicon oil, epoxy-modified silicon oil, epoxy-polyether-modified silicon oil, phenol-modified silicon oil, carboxyl-modified silicon oil, mercapt-modified silicon oil, acryl-modified silicon oil, meacryl-modified silicon oil, α-methylstyrene-modified silicon oil and the like.

The inorganic particulate includes silica particles, alumina particles, titanium oxide particles, barium titanate particles, magnesium titanate particles, calcium titanate particles, strontium titanate particles, iron oxide particles, copper oxide particles, zinc oxide particles, tin oxide particles, quartz sand powder, clay, mica particles, silicate ash stone powder, diatomite, chrome oxide particles, cerium oxide particles, red iron oxide particles, antimony trioxide particles, magnesium oxide particles, zirconium oxide particles, barium sulfate particles, barium carbonate particles, calcium carbonate particles, silicon carbide particles, and silicon nitride and the like. Among these inorganic particulates, silica particulate and titanium dioxide particulate are particularly favorable. These inorganic particles can be used alone or in combination. It is preferable that the amount of the inorganic particulate in the range of 0.1 to 5.0 parts by weight, more preferably in the range of 0.3 to 3 parts by weight, to 100 parts by weight of the toner. Average diameter of primary particle of the inorganic particulate is 100 nm or less, favorably in the range of 3 nm to 70 nm. If particulate has smaller diameter than 3 nm, the particulate is apt to penetrate into the inside of toner particle, hence it becomes difficult to demonstrate function thereof. When the particulate has larger diameter than 70 nm, developer using this particulate is apt to make damage the surface of the photoreceptor, hence is unfavorable.

[Measurement of Liberalization Ratio of Silicon Oil]

Measurement of the liberalization ratio of the silicon oil used in the present invention can be conducted by for example, a quantative method described below, however said measurement is not limited to this quantative method, other suitable method can be applied if it is convenience.

1. Extraction of Liberalized Silicon Oil

Sample is dipped in chloroform, stirred and left. Supernatant is removed by centrifugal separation, then, fresh chloroform is added to the residual solid, stirred and left. These operations are repeated to remove the liberalized silicon oil.

2. Determination of Carbon Amount

The determination of carbon amount is conducted using CHN elements analyzer such as Elements Analyzer, model MT-5 manufactured by Yanako Co. Ltd.

3. Determination of Liberalized Silicon Oil Ratio Calculated According to Following Ratio of liberalized silicon oil is calculated using following calculation formula;

Ratio of liberalized silicon oil=$(C_o-C_1)/C_o \times 100$(%) Calculation formula (Where, $C_o$ is carbon amount in the sample before extraction operation, and $C_1$ is carbon amount in the sample after extraction operation)

[Surface-treating Agent]

Specific examples of surface-treating agent for the additives including the fine oxide particulate include silane coupling agent such as dialkyl dihalogenated silane, trialkyl halogenated silane, alkyl tirhalogenated silane, hexaalkyl disilazane; sililating agent; silanew coupling agent having fluoro-alkyl group; titan coupling agent of organic titanate type; coupling agent of aluminum type; silicon oil; silicon vanish and the like. Among these, more favorable are surface-treating agent of organic silicon compound types, hydrophobe-treating agent of organic silicon compound types.

[Fine Resin Particulate]

Fine resin particulate used in the present invention includes polymer particulate obtained by suspension polymerization, emulsion polymerization for examples such as polystyrene, polymethacrylate, acrylate copolymer; polymer by polycondensation reaction such as silicon resin, benzoguanamine polymer, nylon; fine polymer particulates made of thermosetting resin materials. The external additives of the present invention is used together with such resin particulate, thereby charging-ability of the developer can be strengthened, can decrease toner particles having reversal polarity of charge, hence can decrease the background smearing. Amount to be added into the toner is an amount in the range 0.01 to 5 weight parts for 100 weight parts of the toner, favorably in the range of 0.1 to 2 weight parts.

[Softening Point, Initial Fluidizing Temperature]

With regard to the softening point of the toner of the present invention, can be measured, the softening point and initial fluidizing temperature were measured, at the temperature rising rate of 1° C./min, using a commercially available softening point meter (Trademark "FP 90" made by Mettler Co., Ltd.).

[Glass Transition Point (Tg)]

The glass transition points(Tg) of toners of the present invention were measured with following conditions, using a differential scanning calorimeter "SEIKO1DSC100 by Seiko Co. Ltd.

Differential scanning calorimeter; SEIKO1DSC100 ;SEIKO1SSC5040 (Disk station)

Measurement conditions

Temperature range; 25° C. to 150° C.

Temperature-rising speed; 10° C./min.

Sampling interval; 0.5 sec.

Sample amount; 10 mg

[Molecular Weight]

With regard to molecular weight, number-average molecular weight(Mn), weight-average molecular weight(Mw) and peak molecular weight(Mp) by the GPC (gel permeation chromatography) method were determined as follows. That is, each sample 80 mg was dissolved in THF (tetrahydrofuran) 10 ml to prepare each sample solution, then it was filtrated with 5 μm mesh filter, then this sample solution of 100 μl volume was poured into a column, and held time of period thereof was measured in following condition. And number-average molecular weight of the sample was obtained as a corresponding molecular weight of the standard sample of polystyrene, by using a calibration curve line which having been preliminary drawn by employing, as standard materials, polystyrenes having known average molecular weights respectively, and measuring the held times of periods thereof in the column, plotting the values of the held times for the each known molecular weight of the polystyrene samples, and drawing the curve line connecting the plotted points.

Conditions

Column; Guard column+GLR400M+GLR400M+GLR400M(Hitachi Ltd.)

Temperature of the Column; 40° C.

Migration phase(flowing amount); THF (1 ml/min.)

Peak detection means; UV (λ=254 nm)

[Penetration Degree, Preservative in Hot Condition]

Samples of 10 g were introduced in respective each glass container having 20 cc volume, then they were left to stand for five hours in a constant temperature bath held at 50° C., the samples recovered from the bath tube were tested, by a penetrometer.

[Stillness Friction Coefficient]

Stillness friction coefficient of the intermediate transfer member of the present invention can be obtained as follows. Namely, a portable static friction power gauge (HEIDON TRIBO GEAR MUSES TYPE 94 i200 made by Shinto Science Co. Ltd. was employed for executing the Examples described in this Specification. The static friction power gauge was used in a manner in which, the pressuring plate was being narrowed or nipped by the insides of a photoreceptor belt, in order to make the uniform contact of the intermediate transfer member and the plane indenter of the static friction power gauge. Here, instead of the photoreceptor belt and the intermediate transfer member, drum shape thereof also can be employed. In such case, while contacted area is slightly decreased, accordingly dispersion in measured data is slightly increased, however conducting amendment such as leveling or balancing can diminish the concerned problem.

The stillness friction coefficient can be obtained by measuring the maximum friction power working between the plane indenter provided under the static friction power gauge and the surface of the belt, thereby obtaining the ratio of the maximum friction power and the power mutually pressuring to the perpendicular direction. This plane indenter is metallic one having lightweight of approximately 40 gf with phi (diameter) 40 and being capable of preventing the drawback such as scratch occurrence of belt surface. In general, the measurement is done using a shock absorbing material provided between the plane indenter and the belt. As for this shock absorbing material, while a thin cloth was employed for executing the Examples described in this Specification, however natural fiber such as cotton and linen, synthetic fiber such as rayon-polypropylene, metallic fiber, unwoven cloth and the like can also be used. And foamed materials having adequate hardness, thin films having suitable ruggedness profile are also employable.

The reason to provide such shock absorbing material between the plane indenter and the belt to be measured is as follows. Namely, the intermediate transfer member (or photoreceptor belt) has a deformation based upon surface roughness and softness of material itself, and toner is a powder therefore it sticks at lower part of the concave in concave and convex profiles at belt surface, accordingly, real stillness friction coefficient of the belt surface represented as adhesive power of the belt and the toner is required to be the measured value containing the factor reflected such state of concave in concave and convex profiles. Thus, the measurement is conducted using such shock absorbing material having softness so as to give no damage to the opposite material and having a nature apt to be peeled out easily, thereby evenness pressure can be imposed to the belt, hence can obtain the stillness friction coefficient with good accuracy. The thin cloth employed for executing the Examples described in this Specification is made of stacked fibers, in which the stacked has a diameter about 0.5 mm and each fiber therein has 5 to 30 μm diameter. This cloth deforms when it is pressed between the plane indenter and the belt, and in some times solved from the stacked state gradually, therefore evenness pressure can be imposed to the belt. Material selection for the shock absorbing member may be executed pursuant to the roughness and the softness of object surface.

Hereupon, besides above described measuring method using the static friction power gauge, there is another method as disclosed in Japanese Unexamined laid-open Patent Publication of Tokkai Hei 8-211757, in which angle (θ) of initial sliding down in inclinations of indenter is obtained, and using the formula of "$\mu=\tan\theta$". This Patent Publication discloses a measuring method in which, slide wires of PET (polyethyleneterephthalate) sheet as standard and sample sheet are measured under the conditions that a plane indenter defined by ASTM D-1894 using HEIDON-14DR made by Shinto Science Co. Ltd. is winded up by a PET (polyethyleneterephthalate) sheet, and the sheet are moved to horizon direction at a velocity of 100 mm/min., with 200 gf of vertical load is being imposed between object to be measured and said plane indenter. However, as point out above, stretched resin material used for plane indenter such as PET does not display the state of toner adhesion along concave and convex profile of the surface of the intermediate transfer member, therefore in this case, friction power is examined by only convex parts of sample surface. And in such measurement, sample sheet is prepared by cutting, therefore it is somewhat like as destructive inspection, and can not conduct a real time evaluation expected to measure at any necessary time during running. Accordingly, although the portable static friction power gauge is favorable, however the measurement method is not limited only above mentioned one, and other method as far as it can satisfy the above-described requirements, can be allowed.

[Average Diameter of Dispersed Wax in Particulate Form]

Average diameter of dispersed wax in particulate form in the present invention can be analyzed by observing the prepared very thin cut piece of toner with TEM. If necessary, TEM image is put into the computer, and is analyzed to calculate average diameter of dispersed wax in the particulate form, by using image treating program. Other measurement means than TEM, any means as far as they can measure the average diameter of dispersed wax in the particulate form, can be available without particular limitation, and optical microscope, image by CCD camera, laser microscope are instanced as examples.

[Binder Resin]

Specific examples of the binder resin used in the present invention include polymers of styrene and substituted styrene such as polystyrene, poly-p-chloro-styrene, polyvinyl toluene; styrene type of copolymer such as styrene-p-chlorostyrene copolymer, styrene-polypropylene copolymer, styrene-vinyl toluene copolymer, styrene-vinyl naphthalene copolymer, styrene-methyl acrylate copolymer, styrene-ethyl acrylate copolymer, styrene-butyl acryrate copolymer, styrene-octyl acrylate copolymer, styrene-methyl methacrylate copolymer, styrene-ethyl methacrylate copolymer, styrene-butyl methacryrate copolymer, styrene-α-chloro methacrylate copolymer, styrene-acrylonitrile copolymer, satyrene-vinyl methylketone copolymer, styrene-butadiene copolymer, styrene-isoprene copolymer, styrene-acrylonitrile-indene copolymer, styrene-maleic acid copolymer, styrene-maleic ester copolymer; polymethy methacrylate, polybutyl metacrylate, polyvinyl chloride, polyvinyl acetate, polyethylene, polypropylene, polyester, epoxy resin, polyol resin, polyurethane, polyamido, polyvinyl butural, polyacrylic acid resin, rosin, modified rosin, terpene resin, aliphatic or cycloaliphatic hydrocarbon resin, aromatic petroleum resin, chlorinated paraffin, paraffin wax and the like, they are used alone or in combination. Particularly polyester resin polyol resin are favorable.

More favorably it includes aforementioned polyol resin or a polyol resin having at least epoxy resinous part and polyalkylene part in the main chain structure, thereby sufficient strength for pressuring, sufficient tensile fracture strength, sufficient stability in circumstances, stable fixing characteristics, prevention of toner image transfer to polyvinylchloride sheet surface when the fixed toner image is held in contact with the surface of polyvinylchloride sheet, can be achieved. Particularly effective result is caused in color-reproductive stable brightness, prevention of curling of fixed toner image-receiving sheet, hence more favorable. Further, by containing at least epoxy resinous part and polyalkylene part in the main chain structure of the polyol resin, toner having high strength for pressuring, and having good balancing between flexible retractility and adhesive nature, thus more stable transferring characteristics, more stable developing characteristics, and fixing characteristics are obtained, hence is further favorable.

As the polyester resin, although various kinds of ones can be used, however it is favorable to use particularly a polyester resin which is composed by reaction of following ingredients (i), (ii) and (iii), namely, (i) at least one ingredient selected from a group of divalent carboxylic acid, lower alkyl ester thereof, anhydride thereof;

(ii) diol ingredient having structure shown by following General Formula (2),

General Formula (2)

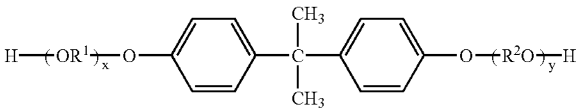

(2)

(Where, $R^1$, $R^2$ are same or mutually different alkyl groups, respectively, having carbon number in the range 2 to 4, and x and y are numbers represent repeating units 1 or more, respectively, and x+y=2 to 16);

(iii) at least one ingredient selected from a group of trivalent carboxylic acid, lower alkyl ester thereof, anhydride thereof.

Hereupon, the examples of said group (i) of divalent carboxylic acid, lower alkyl ester thereof, anhydride thereof include terephthalic acid, isophthalic acid, sebacic acid, isodecyl succinic acid, maleic acid, fumaric acid, and monomethyl-, monoethyl-, dimethyl- and diethyl-esters thereof, phthalic acid anhydride, maleic acid anhydride and other divalent acids. Particularly, terephthalic acid, isophthalic acid and dimethyl esters thereof are favorable from the viewpoints of tolerance for blocking and cost saving. These divalent carboxylic acid, lower alkyl esters thereof, anhydrides thereof significantly effect on fixing characteristics and anti-blocking nature of the toner. Namely, the use of large amount aromatic acid such as terephthalic acid and isophthalic acid decline the fixing characteristics, although improving in anti-blocking nature, yet depending upon the condensation degree thereof. On contrary to this, the use of large amount aliphatic acid such as sebacic acid isodecyl succinic acid, maleic acid, fumaric acid cause the improvement of fixing characteristics, however declining the anti-blocking nature. Accordingly, the kinds and use amounts of these divalent carboxylic acid are properly selected pursuant to the compositions, amounts of other kinds of monomer, and are used alone or in combination.

Specific examples of said group (ii) of diol ingredient having above General Formula (2) include polyoxypropylene-(n)-polyoxy ethylene-(n')-2, 2-bis(4-hydroxy phenyl) propane, polyoxypropylene-(n)-2,2-bis(4-hydroxy phenyl) propane, polyoxyethylene-(n)-2,2-bis(4-hydroxy phenyl) propane and the like diol. Particularly, polyoxy propylene-(n)-2,2-bis(4-hydroxy phenyl) propane having value of repeating units (n)of being in the range of $2.1 \leqq n \leqq 2.5$ and polyoxyethylene-(n)-2,2-bis(4-hydroxy phenyl) propane having value of repeating units (n) of being in the range of $2.0 \leqq n \leqq 2.5$ are favorable. Such diol ingredient has benefits that making elevation of Tg, and making to be easily controllable the reaction.

It is also possible to employ aliphatic diol such as ethylene glycol, diethylene grycol, 1,2-butane diol, 1,3-butane diol, 1,4-butane diol, neopentyl glycol, propylene glycol and the like.

Specific examples of said group (iii) of trivalent carboxylic acid, lower alkyl ester thereof, anhydride thereof include 1,2,4-benzene tricarboxylic acid (trimellitic acid), 1,3,5-benzene tricarboxylic acid, 1,2,4-cyclohexane tricarboxylic acid, 2,5,7-naphthalene tricarboxylic acid, 1,2,4-naphthalene tricarboxylic acid, 1,2,4-butane tricarboxylic acid, 1,2,5-hexane tricarboxylic acid, 1,3-dicarboxyl-2-methyl-2-methylene carboxy propane, tetra(methylenecarboxy)methane, 1,2,7,8-octanetetra tetracarboxylic acid, trimeric acid of Enpol(by Ire Chemical, Korea), and monomethyl-, monoethyl-, dimethyl- and diethyl-esters thereof.

And, specific examples of said group (iii) of tri- or more-valent of polyvalent polyalcohol carboxylic acid, lower alkyl ester include sorbitol, 1,2,3,6-hexane tetrol, 1,4-sorbitan, pentaerythritol, di-pentaerythritol, tri-pentaerythritol, saccharose, 1,2,4-butane triol, 1,2,5-penta triol, glycerol, di-glycerol, 2-methylpropane triol, 2-methyl-1,2,4-butane triol, trimethylol ethane, trimethylol propane, 1,3,5-trihydroxy methyl benzene and the like.

Hereupon, the mix ratio of the polyvalent of tri- or more-valent monomer is favoarably in the level of 1 to 30 mol % in the whole used monomers. When 1 mol or less, anti-offset ability of the toner is declined and durability is also apt to decline. On the other hand, if the mix ratio is not less than 30 mol %, fixing characteristics is apt to decline.

Among these polyvalent of tri- or more-valent monomer, especially benzene tricarboxylic acid and analogue acids are favorable. Namely, it is possible to hold compatible state of excellent fixing characteristics and anti-offset nature, by using these tricarboxylic acids.

When these polyester resins and polyol resins have high crosslink densities, transparency and brightness of the toner become difficult to be achieved, therefore it is favorable to make them in the condition of no crosslinked state or slightly crosslinked state of (insoluble constituents to THF are 5% or less).

There is no special limitation of the preparation method of such binder resin, any of block polymerization, solution polymerization, emulsion polymerization and suspension polymerization can be used.

[Colorant]

Conventionally known dyes and pigments can be employed as the colorant for the toner of the present invention. The colorant may be, for examples, carbon black, a nigrosine dye, iron black, Naphthol Yellow S, Hansa Yellow (10G, 5G, G), cadmium yellow, yellow iron oxide, Chinese yellow, chrome yellow, titanium yellow, Oil Yellow, Hansa Yellow (GR, A, RN and R), Pigment Yellow L, Fast Yellow C, Benzidine Yellow (G,GR), Permanent Yellow NCG, Vulcan Fast Yellow (5G, R), Tartradine Lake, Quinoline Yellow Lake, Anthrazan Yellow BGL, Isoindolinone Yellow, red iron oxide, red lead, lead vermilion, cadmium red, cadmium mercury red, antimony vermilion, Permanent Red 4R, Para Red, Fisay Red, parachloro-orthonitroaniline red, Lithol Fast Scarlet G, Brilliant Fast Scarlet, Brilliant Carmine BS, Permanent Red (F2R, F4R, FRL, FRLL and F4RH), Fast Scarlet VD, Vulcan Fast Lubin B, Brilliant Scarlet G, Lithol Lubin GX, Permanent Red F5R, Brilliant Carmine 6B, Pigment Scarlet 3B, Bordeaux 5B, Toluidine Maroon, Permanent Bordeaux F2K, Helio Bordeaux BL, Bordeaux 10B, Bon Maroon Light, Bon Maroon Medium, Eosin Lake, Rhodamine Lake B, Rhodamine Lake Y, Alizarine Lake, Thioindigo Red B, Thioindigo Maroon, Oil Red, Quinacridon Red, Pyrazolon Red, chrome vermilion, Benzidine Orange, Perinon Orange, Oil Orange, Cobalt Blue, Selulian Blue, Alkali Blue Lake, Peacock Blue Lake, Victoria Blue Lake, non-metal Phthalocyanine Blue, Phthalocyanine Blue, Fast Sky Blue, Indanthrene Blue (RS and BC), Indigo, Iron Blue, Ultramarine Blue, Anthraquinone Blue, Fast Violet B, Methyl Violet Lake, Cobalt Vilet, Manganese Violet, Dioxan Violet, Anthraquinone Violet, Chrome Green, Zinc Green, chromium oxide, Pylidian Emerald Green, Pigment Green B, Naphthol Green B, Green Gold, Acid Green Lake, Marakite Green-Lake, Phthalocyanine Green, Antraquinone Green, titanium oxide, Chinese White (Zinc Oxide), Lithopone. These colorants may be used by themselves or in combination with two or more. The colorant is generally used in an amount of 0.1–50 parts by weight per 100 parts by weight of the binder resin.

[Master Batch Pigment]

The present invention can use the master batch pigment which is prepared, in advance, for the purpose of improving the affinity of resin and pigment, by mixing the resin and the pigment at the ratio of about 1;1 by weight, and kneading the mixture. More favorably, the master batch pigment is prepared by a process in which the pigment is heated and kneaded together with the resin that contains ingredients capable of dissolving into solvent having low polarity, without using organic solvent. And thereby, a master batch excellent in stability for circumstances can be obtained. In addition, the master batch pigment used in the present invention is further improved in the dispensability, by preparing it using a preparation manner in which a dried pigment particulate is employed and the particulate is wetted with resin using water.

Organic pigment used as colorant is hydrophobic in general, however preparation process thereof includes in general the steps of washing with water and drying, thus it makes possible to penetrate water into the inside of the aggregate of pigment particles, by applying some strength degree of power. When this pigment aggregate containing soaked water in the inside of the aggregate and resin are mixed and kneaded by using a kneader of open type at a certain temperature of 100° C. degree or more, the water being contained in the inside of the aggregate is instantaneously heated to the boiling point and explosively expanded, generating power which is stronger than mechanical power in usual, and thus is efficiently crushable the aggregate from the inside of it. In addition, at the moment, the resin has been heated to the temperature higher than softening point thereof, hence its viscosity becomes lower. Accordingly it can wet the aggregate efficiently, and at the same time, the water existing in the inside of the aggregate can easily substitute it, by a fashion similar to so-called flashing. Thereby a master batch can be obtained in which, pigment is existing in a state close to primary particle. Further, heat of vaporization is removed from the kneaded material in the course of water vaporization, accordingly the temperature of the kneaded material is held in a relatively lower level of 100° C. or less, therefore another effect, that shearing force is efficiently imposed to the aggregate, is additionally demonstrated.

Specific examples of the open type kneading machines used in the present invention include conventional two-roll, three-roll kneading machines, a Bumbury's mixer which is used as an open type kneading machine and a continuous two-roll kneading machine manufactured by Mitsui Mining Co., Ltd.

[Charge-controlling Agent]

The toner of the present invention may contain charge-controlling agent if necessary. Conventionally known charge-controlling agents such as Nigrosine dyes, triphenyl methane dyes, metallic complex dyes containing chrome, Rhodamine dyes, alkoxy amines, Quaternary ammonium salts (including fluorine-modified ones), alkyl amides, simple phosphor materials and phosphoric compounds, simple tungsten materials and tungsten compounds, fluorine type surfactants, metallic salicylates, metal salts of derivatives of salicylic acid and the like.

Specific examples include Bontron 03 (Nigrosine dyes), Bontron P-51 (Quaternary ammonium salts), Bontron S-34 (metal-containing azo dyes), E-82 (oxynaphthoic acid type metal complex), E-84 (salicylic acid type metal complex) and E-89 (phenol type condensation products), which are manufactured by Orient Chemical Industries Co., Ltd.; TP-302 and TP-415 (quaternary ammonium salts molybdenum complex), which are manufactured by Hodogaya Chemical Co., Ltd.; Copy Charge PSY VP2038 (quaternary ammonium salts)' Copy Blue PR (triphenylmethane derivatives), Copy Charge NEG VP2036 (quaternary ammonium salts) and Copy Charge NX VP434(quaternary ammonium salts), which are manufactured by Hoechst AG; LRA-901 and LR-147 (boron complex), which are manufactured by Japan Carlit Co.; copper Phthalocyanine; perylene; quinacridone; azo type pigments; and polymer compounds having a functional group such as a sulfonic acid group, a carboxyl group or a quaternary ammonium salt group.

Amount of the charge controlling agent to be used in the toner in the present invention is determined depending upon various factors such as kinds of binder, if presence of other additives incorporated by necessities, preparation methods containing dispersing modes and means, therefore can not determined by single pattern. However it is favorable in general to use the amount from 0.1 to 10 parts by weight, and more preferably from 2 to 5 parts by weight, per 100 parts by weight of the binder resin included in the toner.

[Carrier]

When the toner of the present invention is used for two-component type of developer, it is better to use the toner by mixing with magnetic carrier, the ratio of the carrier and the toner under the developing operation is favorably 1 to 10 weight parts of toner for 100 parts of toner. Suitable magnetizable materials for use as a carrier in the two-component developer of the present invention include conventionally known particulate having diameter of approximately 20 to 200 μm such as ferrite particulate, magnetite particulate, magnetized resin particulate and the like. Specific examples of coating material for the magnetic carrier material include amino resins such as urea-formaldehyde resin, melamine resin, benzo-guanamine resin, urea resin, polyamodo resin; and epoxy resin and the like.

Examples of additionally used resin include vinyl resins and vinylidene resins include acrylic resins such as polymethylmethacrylate resin, poly-acrylonitrile resin and the like; poly-vinylacetate resin; poly-vinylalcohol resin; polyvinylbutyral resin; poly-styrene resins such as poly-styrene, copolymer of styrene and acrylic monomer, and the like; halogenated oleffin resin such as poly-vinylchloride and the like; poly-ester resins such as polyethylene terephtalate resin, poly-butylene terephthalete and the like; poly-carbonate resins; polyethylene resin; poly vinyl fluoride resin; poly vinylidene fluoride resin; poly-trifluoro ethylene resin; polyhexafluoro propylene resin; copolymer of vinyl fluoride and acrylic monomer; copolymer of vinyl fluoride and vinylidene fluoride; fluoro tarpolymer such as tarpolymer of tetra-fluoroethylene and vinyl fluporide and non-fluoride monomer and the like; silicon resin and the like.

The layer thickness of these coating materials is ranged in the scope of 0.01 to 3 μm, favorably 0.1 to 0.3 μm. When less than 0.01 μm thickness, layer is too thin hence is not controllable of thickness and can not demonstrate function as coat layer. And more than 3 μm thickness can not obtain conductivity, hence is unfavorable. And conductive powder and other auxiliary agents can be added if necessary. Examples of conductive powder include metallic powder, carbon black, titania powder, tin oxide powder, zinc oxide powder and the like. They are favorably ones having average particle diameter of 1 μm or less. The particulate having average diameter exceeding 1 μm makes it difficult to control the conductivity.

The toner of the present invention can be used as one-component type of developer which does not use carrier.

[Magnetic Material]

Further the toner of the present invention can be used as a magnetic toner by including a magnetic material. In order to make a magnetic toner, fine particles of a magnetic material are included in the toner particles.

Specific examples of the magnetic materials include ferromagnetic metals such as iron, nickel and cobalt and their metal alloys; compounds including a ferromagnetic metal such as ferrite and magnetite, metal alloys which do not include a ferromagnetic element but becomes ferromagnetic when properly heated such as metal alloys called as "Heusler alloys" including manganese and copper, e.g. manganese copper aluminium and manganese-copper-tin; chrome dioxides, etc. It is preferable that the magnetic materials are evenly dispersed and included in the toner in a form of fine particles having an average particle diameter of from 0.1 to 1 μm. The content of the magnetic material is preferably from 10 to 70 parts by weight and more preferably from 20 to 50 parts by weight per 100 parts by weight of the toner.

[Wax]

In order to impart releasing nature in fixing operation, it is favorable to make containing wax material in the toner or the developer. Particularly, when oil-less fixer, who does not coat oil, is used in image fixing unit, it is favorable to contain wax in the toner. Favorably the wax is one having melting point of 40 to 120° C., particularly 50 to 110° C. Wax having high excess melting point is apt to cause a fault of image fixing at lower temperature. On the other hand, wax having extraordinary low melting point is apt to decline anti-offset nature and preservative ability. Melting point of wax can be measured using differential scanning calorimetric method (DSC). Namely, milligrams sample of the wax is treated at a constant heating speed, for example, 10.degree. C./min, and the temperature at which the heat of melting has a peak value is defined as the melting point.

Examples of wax capable of use in the present invention include solid paraffin wax, micro wax, rice wax, aliphatic acid amido waxes, fatty acid waxes, aliphatic mono-ketones, fatty acid metal salt waxes, fatty acid ester waxex, partially saponified fatty acid ester waxes, silicon wax, higher alcohols, Carnauba wax and other waxes. And polyoleffin such as low molecular polyethylene, low molecular polypropylene also can be used. Particularly, polyoleffin and ester waxes having softening point of 60 to 150° C. by ring and ball method, are favorable. More particularly, ones which have softening point 70 to 120° C. by ring and ball method, are more favorable.

Further, it is found out that the toner becomes favorable when it contains at least one kinds of wax selected from a group of waxes consisting of Carnauba wax which is being treated for removal of free fatty acid and having acid value of not more than 5, ester wax belonged to Montan wax, oxidized rice wax having acid value of 10 to 30, and Sazohl wax.

The Carnauba wax is obtained from source carnauba wax by removal treatment of free fatty acid, therefore acid value is decreased to the level of 5 or less, and is changed into one having smaller microcrystals structure than that of source carnauba wax, therefore has a tendency likely to change into finely dispersed particles of diameter 1 μm or less in the binder resin, showing improved dispersing ability.

With regard to the Montan wax, it is one purified from a mineral material, and has microcrystals structure similar to the treated-Carnauba, therefore has a tendency likely to change into finely dispersed particles of diameter 1 μm or less in the binder resin, showing improved dispersing ability. The Montan wax favorably has acid value 5 to 14.

Diameter of the dispersed wax is favorably 3 μm or less, more favorably 2 μm or less, further favorably 1 μm or less. Although diameter of 3 μm or more makes an increased fluidity of wax and an increased transferring ability of the toner, however decreases the durability of the toner under the high temperature and high humidity, and causes declined charging stability.

The oxidized rice wax is one, which is being oxidized of rice wax by air. The acid value thereof is favorably in the range of 10 to 30. Acid value less than 10 causes a rising of lower limit fixing temperature of the toner, on the other hand, acid value more than 30 causes a tendency apt to elevate the cold offset temperature and decline the fixing ability at low temperature.

With regard to the Sazohl wax, the Sazohl wax H1, H2, A1, A2, A3, A4, A6, A7, A14, C1, C2, SPRAY30, SPRAY40 and the like, all of which are made by Sazohl Compay, South African, can be used. Out of these Waxes, Sazohl wax H1, H2, SPRAY30, SPRAY40 come result an excellent fixing ability at low temperature and an excellent preservative durability of the toner, hence are favorable.

Above described waxes may be used alone or in combination, and excellent performances mentioned above are obtained by the use in the ratio of 1 to 15 weight parts, more favorably 2 to 10 weight parts, for the binder resin 100 weight parts.

[Cleaning Characteristic-improving Agent]

It is more favorable to add a cleaning characteristic-improving agent used for removing the remaining developer of the surfaces of photoreceptor or primary transferring medium, into the toner, or to apply the same agent onto the toner surface.

Specific examples of the cleaning characteristic-improving agent can include metal salt of fatty acid and free fatty acid such as zinc stearate, calcium stearate, stearic acid; and fine polymer particulate prepared by soap-free emulsion polymerization method such as fine particles of poly-methyl-methacrylate and fine particles of polystyrene. These fine polymer particulate favorably have a relative narrow particle size distribution and a volume average particle size in the range of 0.01 μm to 1 μm. The content of the cleaning characteristic-improving agent is favorably 0.001 to 5 weight parts for the toner 100 weight parts, more favorably 0.001 to 1 weight part for the toner 100 weight parts.

[Preparation Method]

A preparation method of a toner comprising at least a step of mechanically mixing ingredients for developer including at least binder resin, main charge controlling agent and pigment, a step of melting and kneading the mixed ingredients for developer, a step of pulverizing the kneaded mixture ingredients for developer and a step of classifying the pulverized particulate, can be employed as the preparation method of the toner of the present invention. This preparation method includes modified preparation methods which are ones having step or steps of re-using the other powders (side products of powder) than final product recovered from said mixing step of ingredients for developer, said melting and kneading step, said pulverizing step or said classifying step.

The above mentioned “other powders (side products of powder)” means various kinds of fine particles generated from said steps and having extremely small particle size or coarse particle size being undesired particle sizes as final product.

Such side products are favorably used in the ratio of 1 to 50 parts for regular substances of the ingredients 99 to 50 parts.

Said mechanical mixing step of ingredients for developer including at least binder resin, main charge controlling agent and pigment, can be conducted by usual mixer equipped with rotary impeller under normal conditions, and has no special limitation.

After finished said mixing step, the mixed is charged into kneader, melted and kneaded. For examples, niaxial or biaxial continuos kneaders and batch type rollermill kneader can be used for the kneader. For examples, KTK type double screw extruder made by Kobe Steel, Ltd., a TEM type double screw extruder made by Toshiba Machine Co., Ltd., a double screw extruder made by KCK Co., Ltd., a PCM type double screw extruder made by Ikegai Tekko Co., Ltd., a KEX type double screw extruder made by Kurimoto, Ltd., and a continuous single screw kneader, for example, Continuous Kneader made by Buss Co., Ltd are favorably used.

It is important that this melting and kneading are performed under the suitable conditions so that molecular chains of the binder resin are not cut. To be tangible, the temperature of this melting and kneading action should be decided by referring the softening point of the binder resin. Because too low temperature than the softening point causes considerable cutting of the molecular chains, in contrary, excess temperature than the softening point does not make progress the dispersion by kneading. And in order to control the amount of volatile elements in the toner, the melting and kneading temperature and time span, and atmosphere, are favorably set under monitoring of the remaining volatile amount in the toner resin.

After finishing the melting and kneading step, the kneaded is pulverized. It is favorable that the kneaded is first of all pulverized to coarse particles, then the coarse particles are pulverized to fine particles. At that instance, a pneumatic pulverizing system is favorably used in which jet air current containing powder materials to be pulverized is forced to collide to the collision plate to pulverize the powder material inti finer particles, or another pulverizing system is favorably used too in which powder materials is introduced and pulverized in a narrow gap between a rotating rotor and stator.

After finishing the pulverizing step, or in combination of the pulverizing step, the pulverized is classified in the air current by using centrifugal power and the like, thereby toner having defined particle size, for example 5 to 20 μm of volume average diameter (mother particulate), is produced. From the viewpoints of image quality, production cost, coverage ratio by the additives, the toner favorably has a volume average particle diameter in the range of 2 to 8 μm. The volume average particle diameter of the toner can be measured using commercially available measuring apparatuses, for example "Coulter Counter Model TA II" (Trademark), made by Coulter Electronics Limited.

When the toner is prepared, in order to increase the fluidity, the durability in preservation, developing ability and transferability and the like characteristic of the toner, thus produced toner (mother toner) may further contain and mix with aforementioned inorganic particulate of the present invention such as hydrophobic silica particulate. Although conventional mixer is used for mixing the external additives into the toner, it is however favorable to equip with water jacket and the like capable of adjusting the inside temperature of the mixer. The amendment of the stress hysteresis loaded on the additives can be achieved by adding the additives at the middle of mixing course too, or by adding them step-wisely. Of course, it is possible to change revolution number, rolling mode, temperature and time. Strong stress at previous period then decreased stress at the latter may be imposed, or adversely, weak stress at initial period then increased stress at the latter may be imposed. Specific examples of the suitable mixers include V-form mixers, locking mixers, Loedge Mixers, Nauter Mixers, Henshel Mixers and the like mixers.

Polymerization method and encapsulation method as other preparation methods are also capable of employing, which are ones outlined below.

[Polymerization Method]

(i) Polymeric monomer, polymerization initiator which is used if necessary, colorant and the like are treated for making granulation thereof, in an aqueous dispersing medium.

(ii) Granulated particulate of monomer composition is classified into groups of particulate by particle size thereof to select a group of particulate having suitable particle size.

(iii) Selected particulate having defined particle size is polymerized.

(iv) After treating of the removal of dispersing agent, obtained polymerization product is filtrated, washed by water and dried, to recover mother particulate.

[Encapsulation Method]

(i) Resin, colorant which is used if necessary and the like are kneaded using kneader, to obtain melted core material for the toner.

(ii) The core material is introduced into water and stirred strongly, to prepare core material having particulate form.

(iii) Said core material is introduced into the solution of shell material, then under stirring, a poor solvent is dropped in the solution, thereby the surfaces of particles of the core material particulate are covered with said shell material, causing encapsulation.

(iv) The obtained capsules are filtrated, washed by water, and dried, to yield mother particulate.

[Intermediate Transfer Medium]

An executing mode of the intermediate transfer body of transfer system of the present invention is described in detail referring to the drawing.

FIG. 1 is a schematic view illustrating a copy machine concerning with an embodiment of the present invention. Referring FIG. 1, a charging roller 20 as charging unit, an exposing device 30, a cleaning device 60 having a cleaning blade, a discharging lamp 70 as discharging device, a developing unit 40, an intermediate transfer body 50 as intermediate transfer means, are arranged around a photoreceptor drum 10 as image-bearing member. The intermediate transfer body 50 is suspended by a plural of suspension rollers 51, and is constructed so as to rotate endless in a direction indicated by an arrow with driving means such as motor which is not shown in this drawing. A part of the suspension rollers 51 has another function of a bias roller supplying bias potential for transferring and is being imposed a predetermined bias voltage from an electric source which is not shown in this drawing, and said cleaning blade of cleaning device 60, which works for intermediate transfer body 50, is also provided on this biased roller 51. And a transfer roller 80, which works for transferring toner image to the transfer paper 100 as final image-receiving member, is provided in facing to the intermediate transfer body 50, and supplied to the transfer roller 80, is transfer bias from an electric source which is not shown in this drawing. A corona charger 52 as charging means is also provided around the intermediate transfer body 50.

Said developing unit 40 is composed by a developing belt 41 as developer-bearing body, a black (it may be represented by merely Bk hereafter) developing unit, an yellow (it may be represented by merely Y) developing unit, a magenta (it may be represented by merely M) developing unit, a cyan (it may be represented by merely C) developing unit, they are arranged in linear facing to a flat surface of the developing belt 41. This developing belt 41 is so composed that it is suspended between a plural of belt rollers and is moved in a direction indicated by an arrow by a driving means such as motor which is not shown in this drawing, and is rotated at the same speed as that of said photoreceptor drum 10 at contact point with the photoreceptor 10.

Formation and feature of each said unit is the same, therefore description is made only for the 45Bk developing unit hereafter, and description of similar features of other developing units 45Y, 45M, 45C to that of the 45Bk developing unit are eliminated, and instead of that, they are represented by marks Y,M,C, which are inserted at the next position of the description of the feature of the developing unit 45Bk.

The developing unit 45Bk is composed by a housing 42Bk storing one-component type of developer consisting of toner mainly, a developer-picking up roller 43Bk, a developer-supplying roller 44Bk, which receives the developer from the developer-picking up roller 43Bk, and passes the developer being adjusted to uniform and thin layer form, to the intermediate transfer body 50. The developer-supplying roller 44Bk also may be imposed a bias voltage which is supplied from an electric source which is not shown in this drawing, if necessary.

Figure 2:
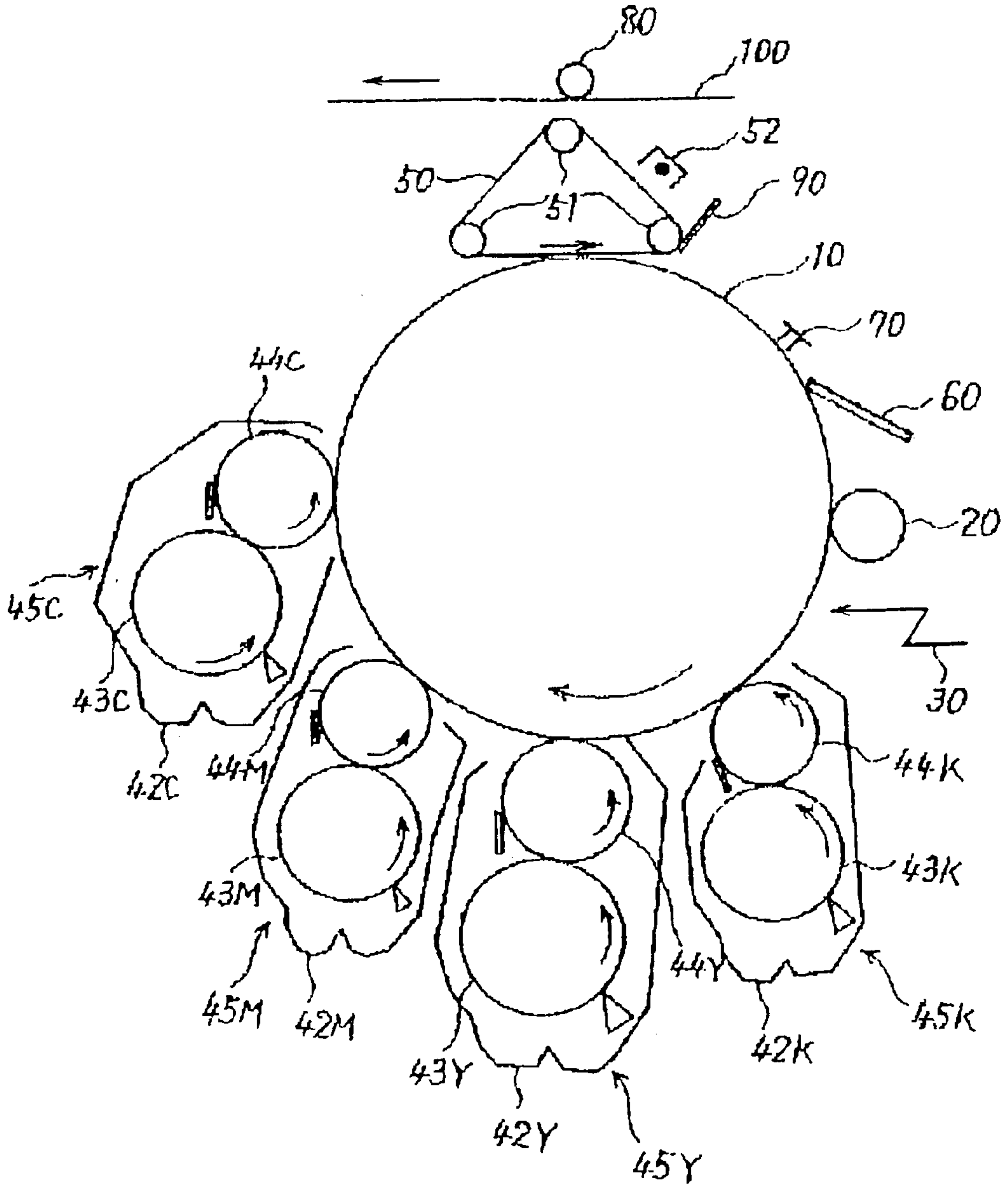
FIG. 2 is a schematic view illustrating the cross section of another embodiment of the electrophotographic photosensitive member of the present invention.

FIG. 2 shows another executing mode of the intermediate transfer body of transfer system of the present invention, in which developing units 45 are arranged around the photoreceptor drum 10 so as to surround the photoreceptor drum 10.

Next, Motion of the copy machine of the present invention shown in FIG. 1 is described in detail.

In the copy machine shown in FIG. 1, the surface of the photoreceptor 10 is uniformly charged by charging roller 20 while the photoreceptor 10 is rotated in the clockwise direction as indicated by arrow, then the charged surface of the photoreceptor 10 is image-wisely exposed to form a latent image by projecting the light formed in image wise configuration through an optical device which is not shown in this FIG. 1 using light reflected from an original. This latent image is then developed by the developing unit 40. Thin layer of the developer on the developing belt 41 is, by contacting with the surface of the photoreceptor at developing area, removed from the developing belt 41 at only the area part corresponding to that of the latent image of photoreceptor 10 and moved to the location of latent image formed on the photoreceptor 10, to form visible toner image. Thus the toner image being developed by the developing unit 40 is, then at a contacted region (primary transfer region) which is a region where the intermediate transfer body 50 is moving at the same speed as that of the rotating photoreceptor, transferred to the surface of the intermediate transfer body 50 (primary transfer). When a plural of transfers for forming image by piled up three or four color toners are performed, said action is repeated for each color, to form color toner image on the intermediate transfer body 50.

A corona charger 52 which has a role to impart an electric charge to the toner image being piled up on the intermediate transfer body 50 is arranged, in a position of downstream side based on the point of facing to and contacting with the photoreceptor 10 of the rotating direction of the intermediate transfer body 50 however which position is upstream side based on the point of facing to and contacting with the image-receiving paper 100 of the rotating direction of the intermediate transfer body 50, This corona charger 52 gives the same polarity of electric charge as that of toner particles of toner image, thereby imparts a sufficient charge to make the toner transferring so as to secure good enough transferring of the toner image to the image-receiving paper 100. Said toners of image are, after charged by said corona charger 52, transferred in lump together the image-receiving paper 100 which is transported from a paper supply part which is not sown in this drawing, by applying transfer bias potential from the transferring roller 80. Then, the image-receiving paper 100 having the transferred toner image is separated from the intermediate transfer body 50 by mean of a separation device which is not shown in this drawing, and then a fixing treatment of its toner image is made using a fixing device which is not shown in this drawing, and is delivered from the copier. On the other hand, from the photoreceptor 10 after transferring operation is, for removal of non-transferred toner thereon, treated by the cleaning device 60, and discharged by discharge lump 70 for removing the remained charge, to prepare a state for next imaging cycle.

The stillness friction coefficient of the intermediate transfer body is, as described above, favorably in the range of 0.1 to 0.6, more favorably 0.3 to 0.5. The volume resistivity of the intermediate transfer body is favorably in the range of ohms/cm to $10^3$ ohms/cm. By establishing the volume resistivity of the intermediate transfer body of this range, charging of the intermediate transfer body itself can be prevented, in addition, the charge imparted by charging device becomes difficult to remain in the intermediate transfer body, therefore can avoid the unevenness of image transfer at the secondary transfer, and easy imposing of bias potential at secondary transfer can be possible.

There is no special limitation in the materials used for making the intermediate transfer body, conventionally known materials can be employed. Examples having following features can be employed.

(1) Belts of materials having high Young's modulus (tensile modulus) suitable for single layer belt such as PC(polycarbonate), PVDF (polyvinylidene fluoride), PAT(polyalkyleneterephthalate), blend material of PC(polycarbonate)/PAT(polyalkyleneterephthalate), blend material of ETFE (ethylene-tetrafluoroethylene copolymers)/PC(polycarbonate), blend material of ETFE (ethylene-tetrafluoroethylene copolymers)/PAT(polyalkyleneterephthalate), thermosetting polyamide dispersing therein carbon black and the like. These belt materials having high Young's modulus (tensile modulus) have advantage that they show few deformation amount for the stress applied at image forming action, therefore are apt to show no positional shift between colors in case of color image forming.

(2) Belts in which said belt having high Young's modulus (tensile modulus) is used as base material, and a surface layer or an intermediate layer is provided on the outer faces or at least an outer face thereof, so as to result two or three layers configuration. This belt having a piled up layers configuration has a function capable of preventing the occurrence of toner void in the middle of line image which was caused by the hard surface of the single layer belt.

(3) Belts having relative low Young's modulus (tensile modulus) due to employing rubber materials or elastomer materials. These belts have a advantages that the no or very few occurrence of toner void in the middle of line image, owning to the softness thereof caused by the rubber materials or elastomer materials, and can prevent the meander movement by using the elasticity of both ears parts projected from the side end of used rollers to the width direction, which can conduct by making the belt width larger than the width of the rollers, hence can realize a lowered cost, without employing any rib or meandering-prevention device.

Conventional intermediate transfer body has been employing resinous materials such as fluorine resin, polycarbonate resin, polyimide resin and the like, however in recent years, belts having elastic materials are prevailingly used, in whole of or a part of layers thereof. There are problems in the belt as follows.

Namely, color image is, in general, formed by four kinds of colored toner. To one sheet of color image, toner layers of first layer to forth layer are accumulated. The toner layers are suffered from the stress by passing primary transfer stage (transfer from the photoreceptor to the intermediate transfer body) and secondary transfer stage(transfer from the intermediate transfer body to the paper as final image-receiving member, thereby aggregation force becomes higher. The higher aggregation power gives a tendency apt to generate the toner void in the middle of line image. Resin belt has high hardness hence does no deform in accordance to the profile of toner layer, therefore easily compress the toner layer, thus is apt to resulting the toner void in the middle of line image.

And, requirement to form color image to various types of image-receiving sheets foe examples such as Japanese paper, emboss treated substrate, has become strong and wide. However, the paper having inferior surface smoothness is likely to occur gaps between it and toner particles at the transferring stage, causing the toner void by transferring. When pressure is raised to increase the tightness of contact between it and toner particles, aggregation power of toner particles becomes higher, resulting the toner void in the middle of line image.

The elastic belt is used with the purpose as follows. Namely, the elastic belt deforms corresponding to the surface irregularity of the paper having inferior surface smoothness. That is to say, the elastic belt can deform pursuant to the small undulations of concave and convex locally existed, therefore good tightness in contact can be obtained, resulting excellent and uniform image, without pressure raising in the course of transferring, even if paper having inferior surface smoothness is employed.

As for the materials for the elastic belt, for examples polycarbonate resin, fluorine resin (such as ETFE, PVDF), polystyrene resin, chloro-polystyrene resin, poly-α-methyl styrene resin, styrene/butadiene copolymer, styrene/vinylchloride copolymer, styrene/maleic acid copolymer, styrene/acrylate ester copolymer(such as styrene/methyl acrylate copolymer, styrene/ethyl acrylate copolymer and the likes), styrene type of resins (homopolymer or copolymer containing styrene monomer or styrene derivative monomer such as, styrene/buthyl acrylate copolymer, styrene/octyl acrylate copolymer, styrene/pheny acrylate copolymer, styrene/methyl methacrylate copolymer, styrene/phenyl methacrylate ester copolymer, styrene/α-chloro methyacrylate copolymer, styrene/acrylonitrile/ethyl acrylate copolymer and the likes), methyl metacrylate resin, butyl metacrylate resin, methy acrylate resin, buty acrylate resin, modified acrylic resin (such as silicon-modified acrylic resin, vinyl chloride-modified acrylic resin, acrylic/urethane resin and the likes), vinyl chloride resin, vinyl chloride/vinyl acetic acid copolymer, rosin-moiddified maleic resin, phenol resin, epoxy resin, polyester resin, polyester-polyurethane resin, polyethylene, polypropylene, polybutadiene, poly-vinilidene chloride, ionomer resin, polyurethane, silicon resin, ketone resin, ethylenene/ethyl acrylate copolymer, xylene resin, polyvinyl butyral resin, polyamido-resin, modified-polyphenylene-oxide resin and the like, are included, but not limited to these. These are used alone or in combination of one two or more kinds of ingredients.

Examples of elastic rubber and elastomer include, but not limited to, Butyl rubber, fluorine rubber, acrylic rubber, EPDM, NBR, nitrile rubber, acrylonitrile/butadiene/styrene rubber, natural rubber, isoprene rubber, styrene/butadiene rubber, butadiene rubber, ethylene/propylene rubber, ethylene/propylene tarpolymer chloroprene rubber, chlorosulfonated polyethylene, chlorinated polyethylene, urethane rubber, syndiotactic-1,2-polybutadiene, epichlorohydrin rubber, silicone rubber, polysulfide rubber, poly-norbornene rubber, thermo elastic elastomer(such as polystyrene type of, polyoreffin type of, polyvinyl chloride type of, poly urethane type of, polyamido type of, polyester type of, polyurea type of fluorine resin type of). These are used alone or in combination of one two or more kinds of ingredients.

Suitable materials for controlling electric resistance (electric resistance-controlling agent as conductant agent) capable of adding into the belt substance used in the present invention include, but of course not limited to, carbon black, graphite powder, metallic powder such as aluminum, nickel and the like metals, or a metal oxide such as tin oxides, titanium oxide, antimony oxide, indium oxides, potassium titanate, antimony oxide/tin oxide complex oxide(ATO), indium oxides/tin oxide complex oxide(ITO). The conductive metallic oxide may be one coated by finely divided insulating particles such as barium sulfate, magnesium silicate, calcium carbonate and the like.

The surface material and surface layer of the belt are required to be ones which can prevent to give pollution to the photoreceptor surface by the elastic material used in the belt, and to minimize the surface friction resistance of the transfer belt to decrease adhesive power of the toner for elevating cleaning nature and secondary transferring characteristic. For instances, suitable one or two or more kinds of materials to decrease surface energy to increase lubricity of the partner materials such as polyurethane, polyester, epoxy resin and the like which are used as the material for the intermediate transfer belt, can be employed. These may be, for instances, one or more kinds of, or different particle sizes of fluorine resins, fluoride compounds, carbon fluoride, titan dioxide, silicon carbide. And belt material itself which is capable of producing a fluorine-rich surface layer to decrease surface energy, by heat treatment, such as fluoride rubber, is also can be employed.

There is no restriction in the preparation method of the intermediate transfer belt. For example, a centrifugal forming method in which fluidity belt material is introduced into a cylindrical die with rotating it, a spray coating method in which a liquid coatings is ejected to form a film material, a dipping method in which a cylindrical die is dipped into a coating liquid then it is lifted from the liquid, a vulcanization method in which compound material is rolled up on the surface of cylindrical die and it is vulcanized, are included. But as already mentioned, the preparation method is not limited to these, and it is possible and general to combine a plural of preparation methods.

As the prevention method of stretch in the belt, for examples, there are a method in which fiber wick material is employed as a wick layer and thereon rubber layers are provided, and another method in which a material for preventing the stretch of the belt is incorporated in the wick material and other method. However the present invention does not concern with production method of the belt.

Wick material used to prevent of the stretch in the belt is one or more materials selected from a group consisting of, for examples, but not restricted to, cotton fibers, synthetic fibers such as nylon fibers, acrylic fibers, polyolefin fibers, polyvinylalcohol fibers, polyvinylchloride fibers, polyvinylidenechloride fibers, polyurethane fibers, polyvinylacetal fibers, polyfluoroethylene fibers, phenol resin fibers, inorganic fibers such as carbon fibers, glass fibers, boron fibers, metal fibers such as steel fibers, copper fibers. Above described wick material is used alone or in combination, for example by mixed spinning, Strings or yarns can be any swisted filaments, for example single swisted yarn, dual swisted yarn, multiple swisted yarn, blend yarn, or textile mixture woven using the strings or yarns can be used. Any fabrication mode, texture, form can be used. And of course, the strings, yarns, textiles obtained therefrom can be treated by conductant agent, before or after spinning or weaving.

There is no restriction for the method of providing the wick layer. For examples, a method in which textile woven in cylindrical shape is put over on a die of cylindrical shape, and thereon the coating layer is provided, another method in which textile woven in cylindrical shape is dipped into a bath of the liquified rubber to provide the rubber layer to one or both sides thereof, or other method in which string or yarn is wind up in spiral mode onto the peripheral surface of a cylindrical shape of die, and thereon the coating layer is provided, can be referred.

With regard to the thickness of the elastic layer, even though it depend upon the hardness of the elastic layer, an excess in the thickness causes expansions and contractions at the outermost layer of the elastic layer, thus apt to occur the cracks thereon. In addition, great deal in the expansions and contractions affects to the size stability of the image obtained, hence unfavorable. The thickness of the elastic layer is favorably about 1 mm or less.

[Tandem Type Color Image Forming Apparatus]

The embodiments of the image forming apparatus of the present invention will be explained in detail referring to drawings.

Figure 3:
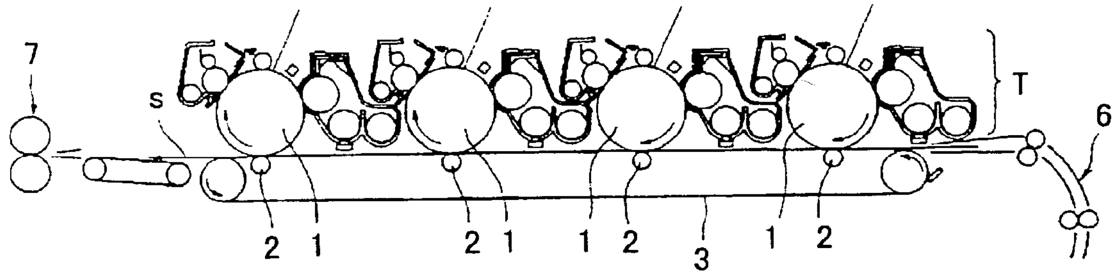
FIG. 3 is a schematic view illustrating the cross section of still another embodiment of the electrophotographic photosensitive member of the present invention.
Figure 4:
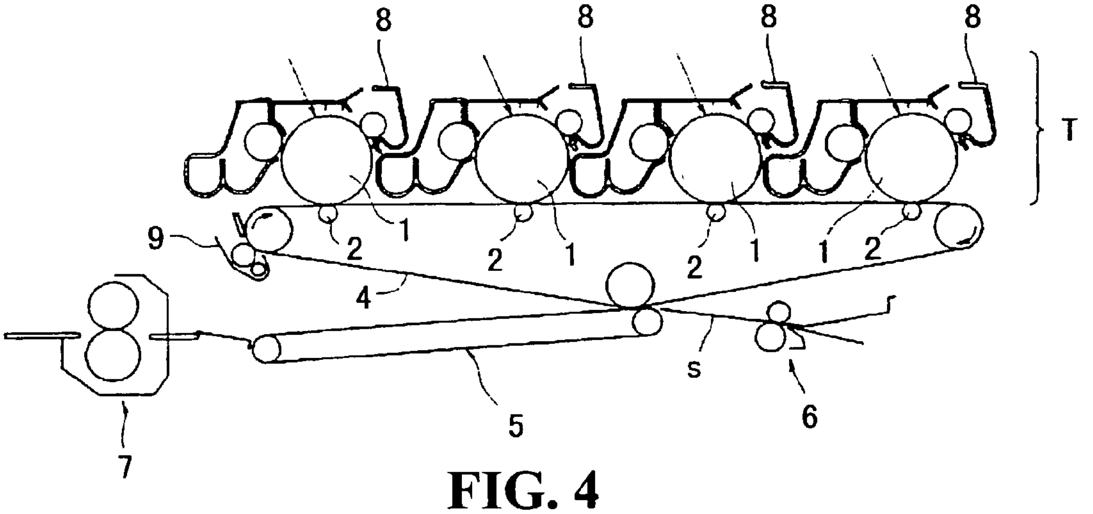
FIG. 4 is a schematic view illustrating the cross section of an embodiment of the image forming apparatus of the present invention.

There are a immediate transfer system as shown in FIG. 3, and an mediate transfer system as shown in FIG. 4 in the tandem image forming system using tandem image forming device. The immediate transfer system transfers each image formed on respective photoreceptors to the sheet(s) transported by sheet transporting belt 3 with using transfer apparatus 4 one by one. The mediate transfer system temporary transfers each image formed on respective photoreceptors to the intermediate transfer medium 4 one after another with using primal transfer apparatus 2, then the image formed on the intermediate transfer medium 4 transfers with using secondary transfer apparatus 5 at once. The later the intermediate transfer system is a system using transfer transport belt, instead of the transfer transport belt, transfer roller can be used.

Comparing an immediate transfer system with a mediate transfer system, the former has a shortcoming that the paper feeder 5 has to be provided at upstream side, and the fixer 7 has to be provided at downstream side, thus the apparatus is enlarged in direction of paper transportation. On the other hand, the latter can install the secondary transfer mean comparative freely, hence is capable of down sizing the apparatus.

In addition, the former has to bring the fixer 7 close to the tandem type of image forming unit(T), for avoiding the expansion of the apparatus scale, therefore can not install the fixer 7 with satisfactory space margin so as to make the sheet bendable, and causes shortcomings that the fixer 7 is likely to affect to image forming action in upstream side, by a shock occurred at inserting the sheet head into the fixer 7, or by a velocity differential between transporting speed of the sheet in passing through the fixer 7 and transporting speed of the sheet in passing through the transfer belt.

On the other hand, the latter can install the fixer with satisfactory space margin so as to make the sheet bendable, therefore it is possible to design the fixer 7 does not affect to image forming action.

Based upon such circumstances, in recent years, an attention has been paid to particularly the immediate transfer method using intermediate transfer belt medium, among tandem type of electrophtographic image forming apparatus.

Intermediate transfer belt medium has been made by using fluoride resin, polycarbonate resin, polyimide, resin and the like resins, while in recent years, the use of elastic belt made of elastic material in whole layers or partial layers thereof has been increasing And in these color electrophotographic apparatuses, as shown in FIG. 4, after primary transfer, toner remaining on the surface of the photoreceptor 1 is removed by photoreceptor cleaning device 8 to clean up the surface of the photoreceptor 1, to prepare a state for embarking next image forming cycle, and after secondary transfer, toner remaining on the surface of the intermediate transfer body 4 is removed by intermediate transfer body cleaning device 9 to clean up the surface of the intermediate transfer body 4, to prepare a state for embarking next image forming cycle.

Figure 5:
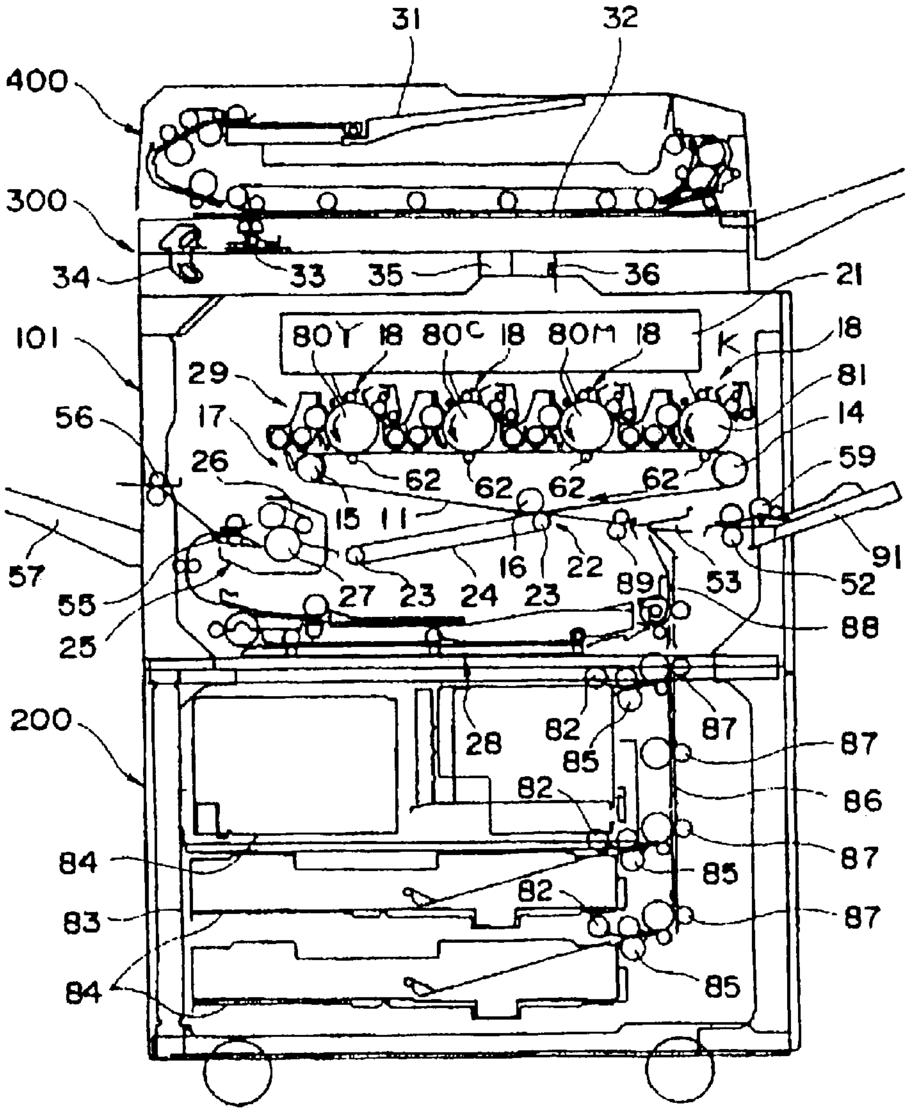
FIG. 5 is a schematic view illustrating the cross section of another embodiment of the image forming apparatus of the present invention.

Referring to FIG. 5 of the drawings, an image forming apparatus embodying the present invention is shown and implemented as a color copier by way of example. As shown, the color copier is generally made up of a copier body 101, a sheet feed table 200 on which the copier body 101 is mounted, a scanner 300 mounted on the copier body 101, and an ADF (Automatic Document Feeder) 400 mounted on the scanner 300.

An intermediate image transfer belt 11 is positioned at the center of the copier body 101 and implemented as an endless belt (transfer belt 11 hereinafter). The transfer belt 11 is a laminate of a base layer, the base layer is formed of fluorocarbon resin, canvas or similar material that stretches little, and an elastic layer is formed on the base layer. This elastic layer is formed of, e.g., fluororubber or acrylonitrile-butadien copolymer rubber. The coating layer covering the elastic layer is formed of, e.g., fluorine-containing resin.

As shown in FIG. 5, the transfer belt 11 is passed over three rollers 14, 15 and 16 and turns in a clockwise direction. In the illustrative embodiment, a belt cleaner or cleaning device 17 is positioned at the left-hand side of the roller 15 for removing toner left on the transfer belt 11 after image transfer.

Four image forming means 18 are arranged side by side above and along the upper, substantially horizontal run of the transfer belt 11 between the rollers 14 and 15, constituting a tandem image forming device. The image forming means 18 are respectively assigned to black, cyan, magenta and yellow.

As shown in FIG. 5, an exposing unit 21 is positioned above the image farming device 29.

A secondary image transfer device 22 is arranged below the lower run of the transfer belt 11 and includes an endless, secondary image transfer belt (secondary transfer belt hereinafter) 24. The secondary transfer belt 24 is passed over two rollers 23 and pressed against the roller 16.

A fixing device 25 is positioned at one side of the secondary image transfer device 22 for fixing a toner image on a paper sheet or similar recording medium. The fixing device 25 includes an endless belt 26 and a press roller 27 pressed against the belt 26.

In the illustrative embodiment, the fixing device 25 is partly positioned below the lower run of the transfer belt 11 although the entire fixing device 25 may be so positioned.

The secondary image transfer device 22 additionally functions to convey the paper sheet to the fixing device 25 after image transfer. The secondary image transfer device 22 may, of course, be implemented as a charger that does not contact the transfer belt 11.

With a charger, however, it is difficult to implement the sheet conveying function.

A turning device 28 is positioned below the secondary image transfer device 22 and fixing device 25 in order to turn the paper sheet upside down in a duplex copy mode. The turning device 28 extends in parallel to the tandem image forming device 29.

In operation, the operator of the color copier sets a document on a document tray 31 included in the ADF 400 or opens the ADF 400, sets a document on a glass platen 32 included in the scanner 300, and then closes the ADF 400. Assume that the operator has set a document on the document tray 31 of the ADF 400.

Then, when the operator pushes a start switch, not shown, the ADF 400 conveys the document to the glass platen 32. Subsequently, a first and a second carriage 33 and 34 included in the scanner 300 are driven. While the first carriage 33 illuminates the document with a light source, the resulting reflection from the document is incident to a mirror included in the second carriage 34. The mirror reflects the incident image-wise light to an image sensor via a lens 35.

On the turn-on of the start switch, a drive motor, not shown, drives one of the rollers 14 through 16 to thereby cause the transfer belt 11 to turn. At the same time, each image forming means 18 rotates a respective image carrier 81, so that a black, cyan, magenta or yellow image is formed on the image carrier 81. The images respectively formed by the four image forming means 18 are sequentially transferred to the transfer belt 11 one above the other in accordance with the rotation of the belt 11, completing a full-color image on the belt 11. Let this image transfer be referred to as primary image transfer. In the illustrative embodiment, the image carriers are implemented as photoconductive drums by way of example.

Further, on the turn-on of the start switch, one of pickup rollers 82 disposed in the paper feed table 200 is driven to pay out a paper sheet from associated one of a plurality of sheet cassettes 84. A separator roller 85 separates paper sheets underlying the top paper sheet from the top paper sheet and conveys the top paper sheet to a sheet conveyance path 86. Rollers 87 sequentially arranged on the path 86 convey the paper sheet to a sheet conveyance path 88 arranged in the copier body 101, causing the paper sheet to abut against a registration roller pair 89.

On the other hand, assume that the operator stacks, e.g., paper sheets on a manual feed tray 91. Then, a pickup roller 59 is rotated to pay out the top paper sheet while a separator roller 52 separates paper sheets underlying the top paper sheet from the top paper sheet. This paper sheet also abuts against the registration roller pair 89.

In any case, the registration roller pair 89 starts conveying the paper sheet in synchronism with the rotation of the transfer belt 11, which carries the full-color image thereon.

The secondary image transfer device 22 conveys the paper sheet carrying the toner image to the fixing device 25. The fixing device 25 fixes the toner image on the paper sheet with heat and pressure. In a simplex copy mode, a path selector 55 steers the paper sheet toward an outlet roller pair 56, so that the paper sheet is driven out to a copy tray 57 via the roller pair 56. In a duplex copy mode, the path selector 55 steers the paper sheet into the turning device 28. The turning device 28 turns the paper sheet upside down and again delivers it to the secondary image transfer position. After a toner image as been formed on the reverse side of the same paper sheet, the outlet roller pair 54 drives the paper sheet to the copy tray 57.

After the image transfer, the belt cleaner 17 removes the toner left on the transfer belt 11 to thereby prepare it for the next image formation.

In general, the registration roller pair 89 is used to be grounded in many cases, while for removal of paper powder from sheets, here, the roller pair 89 may be biased for the purpose of paper dust removal caused from the used sheets.

EXAMPLES

Having generally described this invention, further understanding can be obtained by reference to following specific examples which are provided herein for the purpose of illustration only and are not intended to be limiting. In the descriptions in the following examples, the numbers represent weight ratios unless otherwise specified. Used evaluation method, machines and instruments, and obtained characteristics, and evaluation results are shown in Table 1. The evaluations are conducted as follows.

[Evaluation Machines]

The employed images were evaluated using any one among following machines A, B, C, D or E.

[Machine A]

This was modified one of a tandem type full color laser copy machine having four colors of non magnetic two-component developers and four photoreceptors for four colors, IPSIO Color 8000 made by Ricoh Company Ltd., in which the fixing unit was modified to a oil-less fixing unit and was made tuning. This modified machine B has a high and changeable printing speed of 20 to 50 sheets of A4 size/min.

[Machine B]

This was modified one of a tandem type full color laser copy machine having four colors of non magnetic two-component developers and four photoreceptors for four colors, IPSIO Color 8000 made by Ricoh Company Ltd., in which the image transfer system was modified to a system of primary transferring the toner image to an intermediate transfer body then the transferred toner image was again transferred to the secondary transfer medium as in usual final image receiving medium, in addition, the toner image fixing unit was change into an oil-less fixing unit and was made tuning. This modified machine B has a high and changeable printing speed of 20 to 50 sheets of A4 size/min.

[Machine C]

This was modified one of a tandem type full color laser copy machine having a drum type photoreceptor to be driven four times of color toner images production actions and four times of transferring actions of the produced images to transfer to an intermediate transfer body, one after another, to produce piled up color toner image on the intermediate transfer body, the produced color image is secondary transferred to the surface of secondary transfer medium as in usual final image receiving medium, IPSIO Color 2800 made by Ricoh Company Ltd., in which the fixing unit was modified to a oil-less fixing unit and was made tuning.

[Machine D]

This was modified one of a tandem type full color laser copy machine having a drum type photoreceptor to be driven four times of color toner images production actions and four times of transferring actions of the produced images to transfer to an intermediate transfer body, one after another, to produce piled up color toner image on the intermediate transfer body, the produced color image is secondary transferred to the surface of secondary transfer medium as in usual final image receiving medium, IPSIO Color 5000 made by Ricoh Company Ltd., in which the fixing unit was modified to a oil-less fixing unit and was made tuning.

[Machine E]

This was modified one of a tandem type full color laser copy machine having four colors of non magnetic two-component developers and four photoreceptors for four colors, IPSIO Color 8000 made by Ricoh Company Ltd., in which the fixing unit was modified to a oil-less fixing unit and was made tuning, but it was used in oil coating mode.

[Evaluation Items]

(1) Burial Nature of External Additives

After preserving one week under the atmosphere of temperature 40° C. and humidity 80%, the toner was agitated in the developing unit for 1 hour, thereafter the surfaces of the toner particles were observed to study the buried state of the external additives on the surface of the toner particle, by using FE-SEM (electron emission type scanning electron microscope: Model S-4200 made by Hitachi Ltd.). Smaller bury degree is more excellent, the degree becomes better by the order of marks ×, Δ, ○, ◎.

(2) Toner Scattering Nature

The chart having 50% of image area was output for 30,000 sheets with single color mode, thereafter the used developing unit was opened and toner amount scattered in the developing unit was studied. Smaller scattered amount is better. The scattering nature becomes better by the order of marks ×, Δ, ○, ◎.

(3) White Void of Toner in the Middle of Line Image

The chart having 50% of image area was output for 30,000 sheets with single color mode, then 4sheets of letter images were output in piled up state, to a DX type OHP sheet made by Ricoh, then frequency of the occurrence of non transferred toner parts, which were based upon the number of white voids, were measured, and the obtained were compared to standard samples. The occurrence of white void of toner in the middle of line image becomes better by the order of marks ×, Δ, ○, ◎.

(4) Toner Transfer Ratio

The image chart having 7% of image area was output for 200,000 sheets with single color mode, then loaded toner amount and exhausted toner amount were measured. The toner transfer ratio was calculated by the relation between the loaded toner amount and the exhausted toner amount, with following Expression.

Toner transfer ratio=100×(loaded toner amount−exhausted toner amount)/(loaded toner amount)

Toner transfer ratio 90% or more is marked ◎, toner transfer ratio in the range of 75 to less than 90% is marked ○, toner transfer ratio in the range of 60 to not more than 75% is marked Δ, toner transfer ratio 60% or less is marked ×.

(5) Supplying Ability of Toner

The outputs of image chart having 90% of image area, and the outputs of image having 5% of image area were performed, alternatively, at every 4000 sheets, and at that moments, supplying ability of toner were checked. The Supplying ability of toner becomes better by the order of marks ×, Δ, ○, ◎.

(6) Transfer Dust

The image chart having 50% of image area was output for 30,000 sheets with single color mode, thereafter solid images having area 10 mm×10 mm of were output in piled up state of 4sheets, to an Image-receiving sheet made of paper Type 6000 made by Ricoh, and the obtained were compared to the standard test samples for transfer dust. The transfer dust becomes better by the order of marks ×, Δ, ○, ◎.

(7) Fine Line Reproductive

The image chart having 50% of image area was output for 30,000 sheets with single color mode, thereafter fine line image having 600 dpi resolution were output, to an Image-receiving sheet made of paper Type 6000 paper sheet made by Ricoh, and the obtained were compared to the standard test samples for fine line image reproductive, to compare blurring degrees of fine line images. The fine line reproductive becomes better by the order of marks ×, Δ, ○, ◎.

(8) Background Smearing

The image chart having 50% of image area was output for 30,000 sheets with single color mode, thereafter a white paper was stopped in the developing step, and the remained developer on the photoreceptor surface was transferred to a adhesive transparent tape, which was then compared to an unused tape, in the optical density of both surfaces, using 938 spectrodensitometer (X-Rite) made by X-Rite Corp. Ltd. Lower density is fewer toner transfer hence is better in background smearing, as represented by the order of marks ×, Δ, ○, ◎.

(9) Image Density

The image chart having 50% of image area was output for 150,000 sheets with single color mode, thereafter a solid image was output, to an Image-receiving sheet made of paper Type 6000 made by Ricoh, and the image density of obtained was measured, using a densitometer, X-Rite made by X-Rite Corp. Ltd. This process was repeated each of 4 colors developers, and average value of the 4 colors was calculated. The value less than 1.2 is marked ×, the value in the range 1.2 to less than 1.4 is marked Δ, the value in the range 1.4 to less than 1.8 is marked ○, and the value in the range 1.8 to 2.2 is marked ◎.

(10) Preservative Under High Temperature

Each color of toner 10 g were measured, and stored in 20 ml volume glass containers, and each glass containers were made tapping for 100 times respectively, then they were allowed to stand for 24 hours in a constant temperature bath at 55° C. After that, each sample was provided to penetration test using penetrometer. With order by excellence, mark ◎ is 20 mm or more, mark ○ is in the range 15 mm to not more than 20 mm, mark Δ is in the range 10 mm to not more than 15 mm, mark × is less than 10 mm.

(11) Transparency

A chart having 50% of image area was output for 100,000 sheets with single color mode, then each image sample were fixed to a DX type OHP sheet made by Ricoh, at the conditions of 1.0 mg/$cm^2$ of toner image, fixing temperature 140° C., and they were measured using direct readable haze computer HGM-2DP model made by Suga Manufacturing Co. Ltd. With order by excellence, mark ◎ is excellent, mark ○ is good, mark Δ is fair, mark × is bad.

(12) Color Brightness, Color Reproducibility

A chart having 50% of image area was output for 100,000 sheets with single color mode, to the Image-receiving sheet made of paper Type 6000 made by Ricoh, and the obtained were visually observed by naked eyes. With order by excellence, mark ◎ is excellent, mark ○ is good, mark Δ is fair, mark × is bad.

(13) Glossiness

A chart having 50% of image area was output for 100,000 sheets with single color mode, to the Image-receiving sheet made of paper Type 6000 made by Ricoh, and the obtained were measured, using a gloss meter (VG-1D made by Nippon Denshoku Kogyo Co., Ltd.), with the angle of light incidence being set at 60 degree, and set SW as a switch for changing S and S/10 to the S, and adjusting zero and standard by using a standard plate. With order by excellence, mark ◎ is 15 or more, mark ○ is in the range 6 to not more than 15, mark Δ is in the range 3 to not more than 6, mark × is less than 3.

(14) Stability of Charging Under the High Temperature and High Humidity

Under the conditions of temperature 40° C. and humidity 90%, samplings of the developer being used were made, by every 1000 sheets output, in the course of 100,000 sheets run using a chart having 7% of image area with single color mode, to measure the charge quantities of the used developers by the blow-off method, With order by excellence shown fewer decrease of charge amount, mark ◎ is excellent, mark ○ is good, mark Δ is fair, mark × is bad.

(15) Stability of Charging Under the Low Temperature and Low Humidity

Under the conditions of temperature 10° C. and humidity 15%, samplings of the developer being used were made, by every 1000 sheets output, in the course of 100,000 sheets run using a chart having 7% of image area with single color mode, to measure the charge quantities of the used developers by the blow-off method, With order by excellence shown fewer decrease of charge amount, mark ◎ is excellent, mark ○ is good, mark Δ is fair, mark × is bad.

(16) Fixing Ability

With order by excellence such as lower limit fixing temperature, and upper limit fixing temperature were sufficient in the defined temperature range, no generation of hot offset and cold offset, no adhesion around roller surface, no jamming of paper and the like, hence no or few trouble in transportation of image-receiving paper, showing good fixing ability, mark ◎ is excellent, mark ○ is good, mark Δ is fair, mark × is bad.

[Evaluation of Two-component Developer]

In case of image evaluation with two-component developer, as shown below, ferrite carrier coated with silicon resin layer of 0.3 μm thickness and having average diameter 50 μm were employed, each color toner of 5 weight parts is added to 100 weight parts of respective carrier therefor, and they were homogeneously mixed using TURBULA mixer in which materials were mixed by rolling of the container, to prepared a developer.

[Preparation of Carrier]

Core Material;

| | |
|---|---|
| Cu—Zn ferrite paticles (average particle size; 35 μm) | 5000 parts |
| Coating material | |
| Toluene | 450 parts |
| Silicon resin SR2400 | 450 parts |
| (made by Toray Dow-Corning Silicone Co, non volatile; 50%) | |
| Amino silane SH6020 | 10 parts |
| (made by Toray Dow-Corning Silicone Co) | |
| Carbon black | 10 parts |

Said coating material was dispersed for 10 minutes using a stirrer to prepare coating liquid, and this coating liquid and said core material were introduced in a coating apparatus equipped with a rotable bottom plate disk and a stirrer vane in the fluid bed conducting the coating with causing rotational flow, and the core material was coated by the coating liquid. The coated was baked in an electric furnace at 250° C. for 2 hours, to obtain said carrier.

Example 1

[Fine Oxide Particulate 1, 2]

With regard to liquids of $SiCl_4$ and $TiCl_4$ as source materials for the core, argon gases were separately blow in at the amount of 300 SCCM(standard cubic centimeters per minute) and 50 SCCM respectively, to the liquids of $SiCl_4$ and $TiCl_4$ as source material for the core, using different systems for supplying liquid material, then 250 SCCM of $SiCl_4$ vapor and 5.0 SCCM of $TiCl_4$ vapor were, together with 20SLM (standard litter per minute) of $O_2$ gas and 20SLM of $H_2$ gas, sent to a burner, to hydrolyse and fuse them by flame, thereby blended fine particulate of $SiO_2$ and $TiO_2$ was produced, and this particulate was grown up until it arrived 40 nm of primary particle size, and at the same time, treatment for forming spherical shape was conducted by gas bubbling, thus a fine oxide particulate 1 having the roundness 0.97 was obtained.

The obtained fine oxide particulate 1 was hydrophobe-treated by hexamethyl disilazane, to yield fine oxide particulate 2 having hydrophobic degree 95 (methanol method).

[Fine Oxide Particulate 3]

A preparation process of the fine oxide particulate similar to that of fine oxide particulate 1 was conducted, with the exception of the point that $ZnCl_2$ was employed instead of $TiCl_4$ in above preparation process of fine particulate 1. The obtained fine oxide particulate was hydrophobe-treated by hexamethyl disilazane, to yield fine oxide particulate 3 having hydrophobic degree 96 (methanol method).

[Fine Oxide Particulate 4]

A preparation process of the fine oxide particulate similar to that of fine oxide particulate 1 was conducted, with the exception of the point that $GeCl_4$ was employed instead of $TiCl_4$ in above preparation process of fine particulate 1. The obtained fine oxide particulate was hydrophobe-treated by hexamethyl disilazane, to yield fine oxide particulate 4 having hydrophobic degree 95 (methanol method).

[Fine Oxide Particulate 5]

A preparation process of the fine oxide particulate similar to that of fine oxide particulate 1 was conducted, with the exception of the point that $TiCl_4$ was not employed, $SiCl_4$ only was employed in above preparation process of fine particulate 1. The obtained fine oxide particulate was hydrophobe-treated by hexamethyl disilazane, to yield fine oxide particulate 5 having hydrophobic degree 90 (methanol method).

[Fine Oxide Particulates 6 to 11]

A preparation process of the fine oxide particulate similar to that of fine oxide particulate 1 was conducted, with the exception of the different points that primary particle sizes, the roundness, surface treating agents were changed as shown in Table 2. The obtained fine oxide particulate was hydrophobe-treated by hexamethyl disilazane, to yield fine oxide particulates 6 to 11 having properties as shown in Table 2.

[Polyol Resin 1]

To a separable flask equipped with a stirrer, a thermometer, a $N_2$ inlet and a Cooler, low molecular bisphenol A type epoxy resin (number average molecular weight; about 360) 378.4 g, high molecular weight bisphenol A type epoxy resin (number average molecular weight; about 2700) 86.0 g, di-glycidylated-bisphenol A type propyleneoxiderepoxy adduct (n+m=about 2.1 in said general formula (1)) 191.0 g, bisphenol F 274.5 g, p-cumyl-phenol 70.1 g, and xylene 200 g were introduced. Then the flask was heated 70 to 100° C. under the $N_2$ atmosphere, then lithium chloride 0.183 g was added, and temperature was raised up to the level of 160° C., under vacuum water was added, and water and xylene were bubbled thereby the water, xylene, other volatile, and soluble ingredients in polar solvent were removed, then they were polymerized for 6 to 9 hours at 180° C. of reaction temperature, to obtain 1000 g of polyol resin (polyol resin 1) having properties of Mn 3800, Mw/Mn 3.9, Mp 5000, softening point 109° C., Tg58° C., epoxy equivalent 20000 or more. In the course of polymerization reaction, attention was paid so as to avoid of remaining monomer ingredients. Polyalkylene part of main chain was affirmed by NMR.

[Preparation of Toner]

| <Black toner> | |
|---|---|
| Water | 1000 parts |
| Phthlocyanine Green cake containing water (solid 30%) | 200 parts |
| Carbon black (MA60 made by Mitsubishi Chemical) | 540 parts |
| Polyol resin 1 | 1200 parts |

These source materials were mixed by Henschel mixer, to obtain a mixture in which aggregates of the pigment is being soaked by the water. This mixture was kneaded by two axises roller kneader in which surface temperature of the roller was set at 130° C., for 45 minutes then it was cooled, rolled out, and pulverized by a pulverizer, to obtain a master batch pigment.

| | |
|---|---|
| Polyol resin 1 | 100 parts |
| Above described master batch pigment | 8 parts |
| Charge controlling agent (Bontron E-84, zinc salt of salicylic acid made by Orient Chemical Industries, Ltd.) | 2 parts |
| Wax (fatty acid ester wax, melting point; 83° C., viscousity; 280 m Pa · s at 90° C.) | 5 parts |

Above ingredients were mixed by a mixer, then melted and kneaded by two axises roller kneader three or more times, cooled rolled out. Then the cooled tips were pulverized by a pulverizer (I TYPE MILL manufactured by Nippon Pneumatic Mfg. Co., Ltd.) which is a jet mill using a collision plate, and then the pulverized mixture was classified pneumatically by using a classifier (DS CLASSIFIER manufactured by Nippon Pneumatic Mfg. Co., Ltd.) which uses rotational flow of air, to obtain a black mother toner having a weight average particle diameter of 6.5 μm. Then above described fine oxide particulate 1 of 1.0 weight %, hydrophobic silica having primary particle diameter 10 nm (HDK H2000, made by Clariant Japan K.K.) of 1.0 weight %, titan oxide having primary particle diameter of 15 nm (MT-150A made by Tayca Corp, Japan) of 0.9 weight % were added, and mixed by Henschel mixer, passed a sieve of 50 μm mesh to remove aggregates, thereby obtained black toner 1. Diameter of dispersed wax in the toner was 3 μm.

| <Yellow toner> | |
|---|---|
| Water | 600 parts |
| Pigment Yellolw 17 cake containing water (solid 50%) | 1200 parts |
| Polyol resin 1 | 1200 parts |

These source materials were mixed by Henschel mixer, to obtain a mixture in which aggregates of the pigment is being soaked by the water. This mixture was kneaded by two axises roller kneader in which surface temperature of the roller was set at 130° C., for 45 minutes then it was cooled, rolled out, and pulverized by a pulverizer, to obtain a master batch pigment.

| | |
|---|---|
| Polyol resin 1 | 100 parts |
| Above described master batch pigment | 8 parts |
| Charge controlling agent (Bontron E-84, zinc salt of salicylic acid made by Orient Chemical Industries, Ltd.) | 2 parts |
| Wax (fatty acid ester wax, melting point; 83° C., viscousity; 280 m Pa · s at 90° C.) | 5 parts |

-continued

Above ingredients were mixed by a mixer, then melted and kneaded by two axises roller kneader three or more times, cooled rolled out. Then the cooled tips were pulverized by a pulverizer (I TYPE MILL manufactured by Nippon Pneumatic Mfg. Co., Ltd.) which is a jet mill using a collision plate, and then the pulverized mixture was classified pneumatically by using a classifier (DS CLASSIFIER manufactured by Nippon Pneumatic Mfg. Co., Ltd.) which uses rotational flow of air, to obtain a yellow mother toner having a weight average particle diameter of 6.5 μm. Then above described fine oxide particulate 1 of 1.0 weight %, hydrophobic silica having primary particle diameter 10 nm (HDK H2000, made by Clariant Japan K.K.) of 1.0 weight %, titan oxide having primary particle diameter of 15 nm (MT-150A made by Tayca Corp,Japan) of 0.9 weight % were added, and mixed by Henschel mixer, passed a sieve of 50 μm mesh to remove aggregates, thereby obtained yellow toner 1. Diameter of dispersed wax in the toner was 1 μm.

| <Magenta toner> | |
|---|---|
| Water | 600 parts |
| Pigment Red 57 cake containing water (solid 50%) | 1200 parts |
| Polyol resin 1 | 1200 parts |

These source materials were mixed by Henschel mixer, to obtain a mixture in which aggregates of the pigment is being soaked by the water. This mixture was kneaded by two axises roller kneader in which surface temperature of the roller was set at 130° C., for 45 minutes then it was cooled, rolled out, and pulverized by a pulverizer, to obtain a master batch pigment.

| | |
|---|---|
| Polyol resin 1 | 100 parts |
| Above described master batch pigment | 8 parts |
| Charge controlling agent (Bontron E-84, zinc salt of salicylic acid made by Orient Chemical Industries, Ltd.) | 2 parts |
| Wax (fatty acid ester wax, melting point; 83° C., viscousity; 280 m Pa · s at 90° C.) | 5 parts |

Above ingredients were mixed by a mixer, then melted and kneaded by two axises roller kneader three or more times, cooled rolled out. Then the cooled tips were pulverized by a pulverizer (I TYPE MILL manufactured by Nippon Pneumatic Mfg. Co., Ltd.) which is a jet mill using a collision plate, and then the pulverized mixture was classified pneumatically by using a classifier (DS CLASSIFIER manufactured by Nippon Pneumatic Mfg. Co., Ltd.) which uses rotational flow of air, to obtain a magenta mother toner having a weight average particle diameter of 6.5 μm. Then above described fine oxide particulate 1 of 1.0 weight %, hydrophobic silica having primary particle diameter 10 nm (HDK H2000, made by Clariant Japan K.K.) of 1.0 weight %, titan oxide having primary particle diameter of 15 nm (MT-150A made by Tayca Corp, Japan) of 0.9 weight % were added, and mixed by Henschel mixer, passed a sieve of 50 μm mesh to remove aggregates, thereby obtained Magenta toner 1. Diameter of dispersed wax in the toner was 2 μm.

| <Cyan toner> | |
|---|---|
| Water | 600 parts |
| Pigment Blue 15;3 cake containing water (solid 50%) | 1200 parts |
| Polyol resin 1 | 1200 parts |

These source materials were mixed by Henschel mixer, to obtain a mixture in which aggregates of the pigment is being soaked by the water. This mixture was kneaded by two axises roller kneader in which surface temperature of the roller was set at 130° C., for 45 minutes then it was cooled, rolled out, and pulverized by a pulverizer, to obtain a master batch pigment.

| | |
|---|---|
| Polyol resin 1 | 100 parts |
| Above described master batch pigment | 8 parts |
| Charge controlling agent (Bontron E-84, zinc salt of salicylic acid made by Orient Chemical Industries, Ltd.) | 2 parts |
| Wax (fatty acid ester wax, melting point; 83° C., viscousity; 280 m Pa · s at 90° C.) | 5 parts |

Above ingredients were mixed by a mixer, then melted and kneaded by two axises roller kneader three or more times, cooled rolled out. Then the cooled tips were pulverized by a pulverizer (I TYPE MILL manufactured by Nippon Pneumatic Mfg. Co., Ltd.) which is a jet mill using a collision plate, and then the pulverized mixture was classified pneumatically by using a classifier (DS CLASSIFIER manufactured by Nippon Pneumatic Mfg. Co., Ltd.) which uses rotational flow of air, to obtain a cyan mother toner having a weight average particle diameter of 6.5 μm. Then above described fine oxide particulate 1 of 1.0 weight %, hydrophobic silica having primary particle diameter 10 nm (HDK H2000, made by Clariant Japan K.K.) of 1.0 weight %, titan oxide having primary particle diameter of 15 nm (MT-150A made by Tayca Corp,Japan) of 0.9 weight % were added, and mixed by Henschel mixer, passed a sieve of 50 μm mesh to remove aggregates, thereby obtained Cyan toner 1. Diameter of dispersed wax in the toner was 1.5 μm.

Examples 2 to 8

Preparation processes of the fine oxide particulate and developers, and evaluations similar to that of fine oxide particulate 1 were conducted, with the exception of the points that fine oxide particulates shown in Table 2 were employed, instead of fine oxide particulate employed in Example 1.

Example 9

Preparation processes of the fine oxide particulate and developer, and evaluation similar to that of Example 1 was conducted, with the exception of the point that fine oxide particulate 9 prepared as described below, instead of fine oxide particulate employed in Example 1. Physical properties of the obtained fine oxide particulate are shown in Table 2.

As the source materials for solid solution, silicon (Si) and titan (Ti) were employed, and each source material was held in a heat-resistive boat respectively. Atmospheres were substituted by argon gas, then both were heated in the closed each furnaces which were being vacuumed to the level of 12 kPa. Hereupon, a boat containing silicon was held at 1700° C., while another boat containing titan was held at 2100° C. Each element (single element and element cluster) were carried up subsequently, from the each surfaces of melted materials by ascending currents pursuant to heat convections. By accumulating these ascending currents, fine particulate of silicon-titan solid solution in which element vapor and cluster vapor of elements of silicon and titan were associated. In this case, the temperature of a zones where vapor-accumulation was caused was held at the level of 1100° C. or more. Thereafter, temperature of the furnaces were held at the level of 420° C. or more, and atmospheres were changed to oxidative atmospheres, thereafter oxidation reaction of the fine solid solution particulate was performed for 5 hours. Finally, the furnace was gradually cooled to the room temperature, to obtain fine $SiO_2/TiO_2$ particulate.

The obtained fine oxide particulate was hydrophobe-treated by hexamethyl disilazane, to yield fine oxide particulate 9 having hydrophobic degree 90 (methanol method).

Example 10

Preparation processes of the fine oxide particulate and developer, and evaluation similar to that of Example 1 was conducted, with the exception of the point that 0.5 parts of another external additive, a particulate acrylic resin MP-1000 having an average particle diameter of 400 nm and manufactured by Sohken Chemical Co., Ltd., were added thereto.

Example 11

Preparation processes of the fine oxide particulate and developer, and evaluation similar to that of Example 1 was conducted, with the exception of the point that the kneading condition of toner was changed to stronger kneading(6 times of kneading by the use of three axis roller at 130° C. of roller temperature), so as to make the toner having softening point 110° C., glass transition temperature (Tg) 61° C., initial fluidization temperature 110° C.

Example 12

Preparation processes of the fine oxide particulate and developer, and evaluation similar to that of Example 1 was conducted, with the exception of the point that the kneading condition of toner was changed to weaker kneading (Continuous Kneader made by Buss Co., Ltd was employed and kneading was conducted under weaker kneading condition), so as to make the toner having softening point 130° C., glass transition temperature (Tg) 92° C., initial fluidization temperature 129° C.

Example 13

Preparation processes of the fine oxide particulate and developer, and evaluation similar to that of Example 1 was conducted, with the exception of the point that the kneading condition of toner was changed to weaker kneading(Continuous Kneader made by Buss Co., Ltd was employed and kneading was conducted under weaker kneading condition), so as to prepare a toner having number average molecular weight (Mn) 4300, ratio of weight average molecular weight (Mw) for number average molecular weight (Mn) namely the ratio of (Mw)/(Mn) 3.9, peak molecular weight (Mp) 4900.

Example 14

Preparation processes of the fine oxide particulate and developer, and evaluation similar to that of Example 1 was conducted, with the exception of the point that the kneading condition of toner was changed to stronger kneading(7 times of kneading by the use of three axis roller at 120° C. of roller temperature), so as to prepare a toner having number average molecular weight (Mn) 3500, ratio of weight average molecular weight (Mw) for number average molecular weight (Mn) namely the ratio of (Mw)/(Mn) 2.8, peak molecular weight (Mp) 4200.

Example 15

Preparation processes of the fine oxide particulate and developer, and evaluation similar to that of Example 1 was conducted, with the exception of the point that the resin was change to a polyester resin which was prepared from fumaric acid, polyoxypropylene-(2,2)-bis(4-hydroxyphenul)propane, polyoxyethylene-(2,3)-2,2-bis(4-hydroxyphenyl)propane, trimellitic acid anhydride, and having acid value 10, hydroxy value 30, Mn5000, Mw/Mn ratio 10, Mp 9000, Tg 61° C., softening point 108° C.

Example 16

Preparation processes of the fine oxide particulate and developer, and evaluation similar to that of Example 1 was conducted, with the exception of the point that Carnauba wax which is being treated for removal of free fatty acid and having (acid value 4)4 weight parts was further added in the stage of mixing and kneading. Diameter of dispersed wax in the toner was 0.8 μm.

Example 17

Preparation processes of the fine oxide particulate and developer, and evaluation similar to that of Example 1 was conducted, with the exception of the point that evaluation machine B was used.

Example 18

Preparation processes of the fine oxide particulate and developer, and evaluation similar to that of Example 1 was conducted, with the exception of the point that evaluation machine C was used.

Example 19

Preparation processes of the fine oxide particulate and developer, and evaluation similar to that of Example 1 was conducted, with the exception of the point that evaluation machine D was used.

Example 20

Preparation processes of the fine oxide particulate and developer, and evaluation similar to that of Example 1 was conducted, with the exception of the point that toner was prepared without use of wax, and evaluation machine E was used.

Comparative Examples 1 to 4

Preparation processes of the fine oxide particulate and developer, and evaluation similar to that of Example 1 was conducted, with the exception of the point that the fine oxide particulate shown were used.

TABLE 1

| | Evaluation machine | Burial nature of external additives | Toner scattering nature | White void of toner in the middle of line image | Toner transfer ratio | Supplying ability of toner | Transfer dust | Fine line reproductive | Background smearing | Image density |
|---|---|---|---|---|---|---|---|---|---|---|
| Ex. 1 | A | ○ | ○ | ○ | ○ | ○ | ○ | ○ | ○ | ◎ |
| Ex. 2 | A | ○ | ○ | ○ | ○ | ○ | ○ | ○ | ○ | ◎ |
| Ex. 3 | A | ○ | ○ | ○ | ○ | ○ | ○ | ○ | ○ | ◎ |
| Ex. 4 | A | ○ | ○ | ○ | ○ | ○ | ○ | ○ | ○ | ◎ |
| Ex. 5 | A | ○ | ○ | ○ | ○ | ○ | Δ | Δ | ○ | ◎ |
| Ex. 6 | A | Δ | ○ | Δ | Δ | ○ | ○ | ○ | ○ | ◎ |
| Ex. 7 | A | ◎ | Δ | ◎ | ○ | Δ | ○ | ○ | ○ | ○ |
| Ex. 8 | A | ◎ | Δ | ◎ | ◎ | Δ | ○ | ○ | ○ | ○ |
| Ex. 9 | A | Δ | Δ | ○ | ○ | ○ | ○ | ○ | ◎ | ○ |
| Ex. 10 | A | ◎ | ◎ | ○ | Δ | Δ | ○ | ○ | ○ | ◎ |
| Ex. 11 | A | ○ | ○ | ○ | ◎ | Δ | ○ | ○ | ○ | ◎ |
| Ex. 12 | A | ◎ | ◎ | ○ | ◎ | ◎ | ○ | ○ | ○ | ◎ |
| Ex. 13 | A | ◎ | ○ | ○ | ◎ | ○ | ○ | ○ | ○ | ◎ |
| Ex. 14 | A | ○ | ○ | ○ | ◎ | ○ | ○ | ○ | ○ | ◎ |
| Ex. 15 | A | ◎ | ○ | ○ | ◎ | ○ | ○ | ○ | ○ | ◎ |
| Ex. 16 | A | ○ | ○ | ◎ | ◎ | Δ | ○ | ○ | ○ | ◎ |
| Ex. 17 | B | ○ | ○ | ○ | ○ | ○ | Δ | ○ | ○ | ◎ |
| Ex. 18 | C | ○ | Δ | ○ | Δ | ○ | Δ | ○ | ○ | ◎ |
| Ex. 19 | D | ○ | ○ | ○ | ○ | ○ | Δ | ○ | ○ | ◎ |
| Ex. 20 | E | ○ | ○ | ○ | ○ | ◎ | ○ | ○ | ○ | ◎ |
| Com. Ex. 1 | A | Δ | X | X | X | ○ | X | Δ | X | Δ |
| Com. Ex. 2 | A | ○ | X | X | X | X | X | Δ | X | Δ |

TABLE 1-continued

| | | | | | | | | | | |
|---|---|---|---|---|---|---|---|---|---|---|
| Com. Ex. 3 | A | ○ | X | X | X | ○ | X | Δ | X | Δ |
| Com. Ex. 4 | A | ○ | X | X | X | X | X | Δ | X | X |

| | Preservative under high temperature | Transparency | Color brightness | Color reproducibility | Glossiness | Stability of charging under the high temperature and high humidity | Stability of charging under the low temperature and low humidity | Fixing ability |
|---|---|---|---|---|---|---|---|---|
| Ex. 1 | ○ | ○ | ○ | ◎ | ◎ | ○ | ○ | ○ |
| Ex. 2 | ○ | ○ | ○ | ◎ | ◎ | ◎ | ◎ | ○ |
| Ex. 3 | ○ | ○ | ○ | ◎ | ◎ | ◎ | ○ | ○ |
| Ex. 4 | ○ | ○ | ○ | ◎ | ◎ | ○ | ◎ | ○ |
| Ex. 5 | ○ | ○ | ○ | ◎ | ◎ | ○ | ○ | ○ |
| Ex. 6 | ○ | ○ | ○ | ◎ | ◎ | ○ | ○ | ○ |
| Ex. 7 | ○ | ○ | ○ | ○ | ○ | ○ | ○ | Δ |
| Ex. 8 | ○ | ○ | ○ | ○ | ○ | ○ | ○ | Δ |
| Ex. 9 | ○ | ○ | ○ | ○ | ○ | ○ | ○ | ○ |
| Ex. 10 | ○ | ○ | ○ | ◎ | ◎ | ○ | ○ | ◎ |
| Ex. 11 | ○ | ◎ | ○ | ◎ | ◎ | ○ | ○ | ◎ |
| Ex. 12 | ○ | ○ | Δ | Δ | Δ | ○ | ○ | Δ |
| Ex. 13 | ○ | ○ | ○ | ◎ | ◎ | ○ | ○ | ◎ |
| Ex. 14 | ○ | ◎ | ◎ | ◎ | ◎ | ◎ | ○ | ◎ |
| Ex. 15 | ◎ | ◎ | ◎ | ◎ | ◎ | ○ | ○ | ◎ |
| Ex. 16 | ○ | ○ | ○ | ◎ | ◎ | ◎ | ○ | ◎ |
| Ex. 17 | ○ | ○ | ○ | ○ | ◎ | ○ | ○ | ○ |
| Ex. 18 | ○ | ○ | ○ | ○ | ◎ | Δ | Δ | ○ |
| Ex. 19 | ○ | ○ | ○ | ○ | ◎ | ○ | ○ | ○ |
| Ex. 20 | ○ | ○ | ○ | ○ | ◎ | ○ | ○ | ○ |
| Com. Ex. 1 | Δ | Δ | ○ | ○ | ○ | X | X | ○ |
| Com. Ex. 2 | ○ | Δ | ○ | ○ | Δ | X | X | X |
| Com. Ex. 3 | X | Δ | ○ | ○ | ○ | X | X | ○ |
| Com. Ex. 4 | Δ | Δ | ○ | ○ | ○ | X | X | ○ |

TABLE 2

| | Finely divided oxide particulate | Primary particle diameter (nm) | Roundness | Surface-treating agent | Hydrophobe-treating degree | Liberalization ratio of silicon oil (%) | Doping element | Distribution state of dope element |
|---|---|---|---|---|---|---|---|---|
| Ex. 1 | 1 | 40 | 0.97 | — | — | — | Ti | Uniform |
| Ex. 2 | 2 | 40 | 0.97 | Hexamethyl disilazane | 98 | — | Ti | Uniform |
| Ex. 3 | 3 | 40 | 0.98 | Hexamethyl disilazane | 96 | — | Zn | Uniform |
| Ex. 4 | 4 | 35 | 0.96 | Hexamethyl disilazane | 96 | — | Ge | Uniform |
| Ex. 5 | 5 | 50 | 0.97 | Hexamethyl disilazane | 80 | — | — | — |
| Ex. 6 | 6 | 31 | 0.95 | Dimethyl dichlorosilane | 95 | — | Ti | Uniform |
| Ex. 7 | 7 | 149 | 0.995 | Dimethyl silicon oil | 98 | 20 | Ti | Uniform |
| Ex. 8 | 8 | 149 | 0.995 | Dimethyl silicon oil | 98 | 50 | Ti | Uniform |
| Ex. 9 | 9 | 40 | 0.97 | Hexamethyl disilazane | 90 | — | Ti | Unevenness |
| Com. Ex. 1 | 10 | 28 | 0.96 | Hexamethyl disilazane | 91 | — | Ti | Uniform |
| Com. Ex. 2 | 11 | 160 | 0.98 | Hexamethyl disilazane | 95 | — | Ti | Uniform |
| Com. Ex. 3 | 12 | 40 | 0.94 | Hexamethyl disilazane | 80 | — | Ti | Uniform |
| Com. Ex. 4 | 13 | 40 | 0.997 | Hexamethyl disilazane | 60 | — | Ti | Uniform |

As can be seen from specified descriptions including tangible Examples and Relative Examples, according to the present invention, an external additives for electrophotographic toner comprising finely divided oxide particulate including a silicon compound and a compound for doping said oxide particulate, wherein particle diameter of the primary particle of said finely divided oxide particulate is in the range of 30 nm to 150 nm, and the primary particle of said finely divided oxide particles is substantially spherical shape having the roundness in the range of 0.95 to 0.996, is provided. And this external additives is capable of evading from the embedding of external additives into toner even if after the toner is held in the storage under the condition of high temperature and high humidity, thereby the additives is capable of showing sufficient functions as fluidizing agent and charge supplement agent, and is capable of inhibiting an abnormal charge elevation even after being stored under the low temperature and low humidity.

Further, it is adequately controlled in aggregate property and adhesive power between toner particles being suffered from the stress by suppression of toner during of transferring of the toner or in development device, and weakly charged toner particles and reverse polarity of toner particles are very few.

What is claimed is:

1. An external additive for an electrophotographic toner comprising a finely divided oxide particulate, wherein the finely divided oxide particulate comprises a silicon oxide and an oxide of at least one element selected from the group consisting of Mg, Ca, Ba, Al, Ti, V, Sr, Zr, Si, Sn, Zn, Ga, Ge, Cr, Mn, Fe, Co, Ni and Cu, the finely divided oxide particulate has primary particles, wherein the particle diameter of the primary particles of the is in the range of 30 nm to 150 nm, and the primary particles of said finely divided oxide particles have a substantially spherical shape having a roundness in the range of 0.95 to 0.996.

2. The additive according to claim 1, wherein elemental ingredients composing the particle of the finely divided oxide particulate are uniformly distributed at surface and inside parts.

3. The additive according to claim 1, wherein the finely divided oxide particulate comprises the silicon oxide and an oxide of Ti.

4. The additive according to claim 1, wherein the finely divided oxide particulate is, at surface thereof, treated by at least silicon-containing organic surface-treating agent.

5. The additive according to claim 1, wherein the finely divided oxide particulate is, at surface thereof, treated by at least silicon oil, and a liberalization ratio of said silicon oil is in the range of 10% to 60%.

6. The additive according to claim 1, wherein the finely divided oxide particulate comprises the silicon oxide and an oxide of Zn.

7. The additive according to claim 1, wherein the particle diameter of the primary particles of the is in the range of 40 nm to 100 nm.

8. An electrophotographic toner having a volumetric average particle diameter in the range of 2 μm to 10 μm, and comprising at least a binder resin and a colorant, wherein the toner comprises the external additive according to claim 1.

9. An electrophotographic developer of two-component comprising an electrophotographic toner and a carrier of magnetic particles, said electrophotographic toner having a volumetric average particle diameter in the range of 2 μm to 10 μm, and comprising at least a binder resin and a colorant, wherein the toner comprises the external additive of claim 1.

10. An image forming apparatus loaded by a container filled with an electrophotographic toner, said electrophotographic toner having a volumetric average particle diameter in the range of 2 μm to 10 μm, and comprising at least a binder resin and a colorant, wherein the toner comprises the external additive according to claim 1.

* * * * *